(12) United States Patent
Deshpande et al.

(10) Patent No.: US 11,025,940 B2
(45) Date of Patent: Jun. 1, 2021

(54) METHOD FOR SIGNALLING CAPTION ASSET INFORMATION AND DEVICE FOR SIGNALLING CAPTION ASSET INFORMATION

(71) Applicant: SHARP KABUSHIKI KAISHA, Sakai (JP)

(72) Inventors: Sachin G. Deshpande, Vancouver, WA (US); Kiran Mukesh Misra, Vancouver, WA (US)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/850,799

(22) Filed: Apr. 16, 2020

(65) Prior Publication Data

US 2020/0244981 A1    Jul. 30, 2020

Related U.S. Application Data

(63) Continuation of application No. 15/756,154, filed as application No. PCT/JP2016/004026 on Sep. 2, 2016, now Pat. No. 10,708,611.

(60) Provisional application No. 62/214,866, filed on Sep. 4, 2015, provisional application No. 62/220,831, filed on Sep. 18, 2015, provisional application No.
(Continued)

(51) Int. Cl.
*H04N 19/46*    (2014.01)
*H04N 19/597*    (2014.01)
*H04N 21/47*    (2011.01)
*H04N 21/435*    (2011.01)
(Continued)

(52) U.S. Cl.
CPC .......... *H04N 19/46* (2014.11); *H04N 19/597* (2014.11); *H04N 19/70* (2014.11); *H04N 21/435* (2013.01); *H04N 21/47* (2013.01); *H04N 21/4884* (2013.01)

(58) Field of Classification Search
CPC ...... H04N 19/46; H04N 19/597; H04N 19/70; H04N 21/435; H04N 21/4884; H04N 2005/44526; H04N 21/47; H04N 5/44513
See application file for complete search history.

(56) References Cited

U.S. PATENT DOCUMENTS

2002/0031186 A1    3/2002  Nakazawa et al.
2003/0167277 A1*   9/2003  Hejlsberg .................. G06F 9/46
(Continued)

FOREIGN PATENT DOCUMENTS

EP        2840795 A1    2/2015
WO    2015/009628 A1    1/2015

OTHER PUBLICATIONS

Non-final office action dated Jul. 25, 2019 in U.S. Appl. No. 15/756,154.
(Continued)

*Primary Examiner* — Anner N Holder
(74) *Attorney, Agent, or Firm* — ScienBiziP, P.C.

(57) ABSTRACT

A method for signaling video parameters associated a video asset included in a multimedia presentation, the method comprising: signaling a flag indicating whether picture rate information is present in a descriptor associated with the video asset; and signaling picture rate information for one or more layers of encoded video data corresponding to the video asset based on the flag, wherein picture rate information includes a code value indicating a picture rate value.

5 Claims, 7 Drawing Sheets

Related U.S. Application Data

62/239,956, filed on Oct. 11, 2015, provisional application No. 62/242,284, filed on Oct. 15, 2015, provisional application No. 62/270,540, filed on Dec. 21, 2015, provisional application No. 62/288,394, filed on Jan. 28, 2016.

(51) Int. Cl.
*H04N 21/488* (2011.01)
*H04N 19/70* (2014.01)

(56) References Cited

U.S. PATENT DOCUMENTS

| | | | |
|---|---|---|---|
| 2006/0045130 A1* | 3/2006 | Kim | H04L 69/22 370/469 |
| 2006/0165298 A1 | 7/2006 | Kikuchi | |
| 2008/0040345 A1* | 2/2008 | Cameron | G06F 7/02 |
| 2009/0010332 A1 | 1/2009 | Jeon et al. | |
| 2009/0249392 A1* | 10/2009 | Park | H04N 21/8133 725/38 |
| 2010/0098154 A1 | 4/2010 | Lou et al. | |
| 2010/0284473 A1* | 11/2010 | Suh | H04N 21/235 375/240.26 |
| 2011/0247031 A1* | 10/2011 | Jacoby | H04N 21/8166 725/25 |
| 2013/0034032 A1 | 2/2013 | Vare et al. | |
| 2014/0092955 A1* | 4/2014 | Wang | H04N 19/187 375/240.02 |
| 2015/0016544 A1 | 1/2015 | Wang et al. | |
| 2015/0143419 A1* | 5/2015 | Bhagwat | H04N 21/44231 725/37 |
| 2015/0163505 A1 | 6/2015 | Sato | |
| 2015/0365686 A1 | 12/2015 | Kang et al. | |
| 2015/0373376 A1 | 12/2015 | Wang et al. | |
| 2016/0227227 A1 | 8/2016 | Deshpande | |
| 2017/0105055 A1* | 4/2017 | Lee | H04N 21/439 |

OTHER PUBLICATIONS

Final office action dated Jan. 22, 2020 in U.S. Appl. No. 15/756,154.
Notice of Allowance dated Mar. 24, 2020 in U.S. Appl. No. 15/756,154.

* cited by examiner

METHOD FOR SIGNALLING CAPTION ASSET INFORMATION AND DEVICE FOR SIGNALLING CAPTION ASSET INFORMATION

TECHNICAL FIELD

The present disclosure relates to the field of interactive television.

BACKGROUND ART

Digital media playback capabilities may be incorporated into a wide range of devices, including digital televisions, including so-called "smart" televisions, set-top boxes, laptop or desktop computers, tablet computers, digital recording devices, digital media players, video gaming devices, cellular phones, including so-called "smart" phones, dedicated video streaming devices, and the like. Digital media content (e.g., video and audio programming) may originate from a plurality of sources including, for example, over-the-air television providers, satellite television providers, cable television providers, online media service providers, including, so-called streaming service providers, and the like. Digital media content may be delivered over packetswitched networks, including bidirectional networks, such as Internet Protocol (IP) networks and unidirectional networks, such as digital broadcast networks.

Digital media content may be transmitted from a source to a receiver device (e.g., a digital television or a smart phone) according to a transmission standard. Examples of transmission standards include Digital Video Broadcasting (DVB) standards, Integrated Services Digital Broadcasting Standards (ISDB) standards, and standards developed by the Advanced Television Systems Committee (ATSC), including, for example, the ATSC 2.0 standard. The ATSC is currently developing the so-called ATSC 3.0 suite of standards. The ATSC 3.0 suite of standards seek to support a wide range of diverse video services through diverse delivery mechanisms. For example, the ATSC 3.0 suite of standards seeks to support broadcast video delivery, so-called broadcast streaming/file download video delivery, so-called broadband streaming/file download video delivery, and combinations thereof (i.e., "hybrid services"). An example of a hybrid video service contemplated for the ATSC 3.0 suite of standards includes a receiver device receiving an over-the-air video broadcast (e.g., through a unidirectional transport) and receiving a synchronized video and closed caption presentation from an online media service provider through a packet network (i.e., through a bidirectional transport). Current proposed techniques for supporting diverse video services through diverse delivery mechanisms and caption services may be less than ideal.

SUMMARY OF INVENTION

In general, this disclosure describes techniques for signaling (or signalling) video parameters and information associated with caption services associated with a multimedia presentation. In particular, this disclosure describes techniques for signaling video parameters and a language associated with a caption service using a media transport protocol. In one example, video parameters and a language associated with a caption service may be signaled within a message table and a signalling message encapsulated within a transport package logical structure. It should be noted that caption services may, in some examples, also be referred to as caption assets. The techniques described herein may enable efficient transmission of data. The techniques described herein may be particular useful for multimedia presentation including multiple video elements (which may be referred to as streams in some examples). Examples of multimedia presentations including multiple video elements include multiple camera view presentations, three dimensional presentations through multiple views, temporal scalable video presentations, spatial and quality scalable video presentations. It should be noted that in some examples captions may be referred to as subtitles. It should be noted that although in some examples the techniques of this disclosure are described with respect to ATSC standards and High Efficiency Video Compression (HEVC) standards, the techniques described herein are generally applicable to any transmission standard. For example, the techniques described herein are generally applicable to any of DVB standards, ISDB standards, ATSC Standards, Digital Terrestrial Multimedia Broadcast (DTMB) standards, Digital Multimedia Broadcast (DMB) standards, Hybrid Broadcast and Broadband Television (HbbTV) standard, World Wide Web Consortium (W3C) standards, Universal Plug and Play (UPnP) standards, and other video encoding standards.

Solution to Problem

According to the present invention, there is provided a method for signaling video parameters associated a video asset included in a multimedia presentation, the method comprising: signaling a flag indicating whether picture rate information is present in a descriptor associated with the video asset; and signaling picture rate information for one or more layers of encoded video data corresponding to the video asset based on the flag, wherein picture rate information includes a code value indicating a picture rate value.

According to the present invention, there is provided a device for rendering a video asset included in a multimedia presentation, the device comprising one or more processors configured to: receive a descriptor associated with a video asset; parse a flag indicating whether picture rate information for the video asset is present in the descriptor; parse picture rate information corresponding to the video asset based on the flag indicating picture rate information is present in the descriptor, and determine a picture rate corresponding to the video asset based on a code value indicating a picture rate value.

According to the present invention, there is provided a method for determining one or parameters of a video asset included in a multimedia presentation, the method comprising: receiving a descriptor associated with a video asset; parse one or more flags indicating whether a type of information for the video asset is present in the descriptor, wherein the one or more flags include a temporal scalability information present flag, a scalability information present flag, a multi-view information present flag, a picture quality present flag, picture rate information present flag, a bit rate information flag and a color information present flag; and determining one or more parameters of the video asset by parsing one or more syntax elements corresponding to a respective flag.

The details of one or more examples are set forth in the accompanying drawings and the description below. Other features, objects, and advantages will be apparent from the description and drawings, and from the claims.

DESCRIPTION OF EMBODIMENTS

Figure 1:
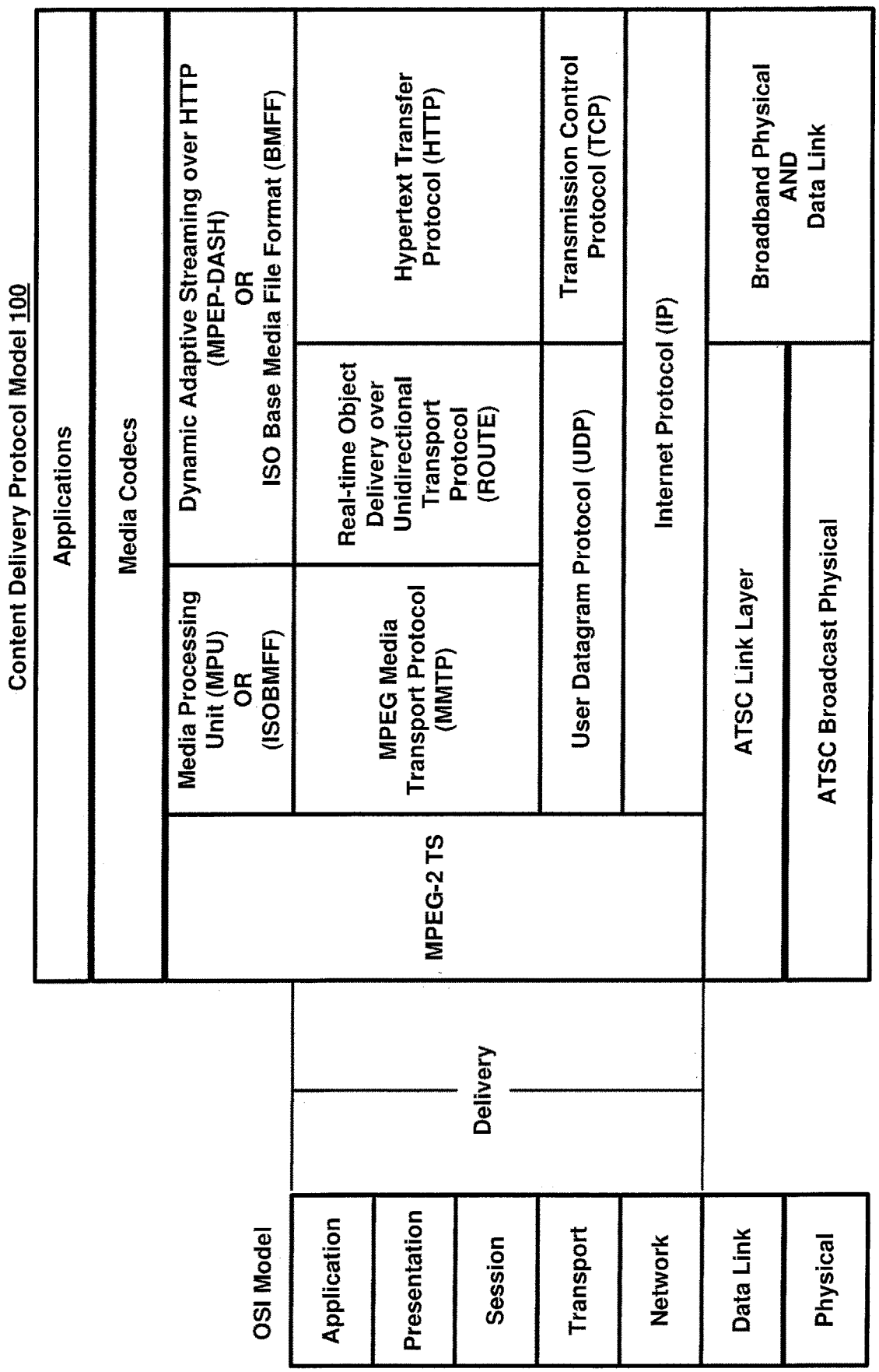
FIG. 1 is a conceptual diagram illustrating an example of content delivery protocol model according to one or more techniques of this disclosure.

Computing devices and/or transmission systems may be based on models including one or more abstraction layers, where data at each abstraction layer is represented according to particular structures, e.g., packet structures, modulation schemes, etc. An example of a model including defined abstraction layers is the so-called Open Systems Interconnection (OSI) model illustrated in FIG. 1. The OSI model defines a 7-layer stack model, including an application layer, a presentation layer, a session layer, a transport layer, a network layer, a data link layer, and a physical layer. A physical layer may generally refer to a layer at which electrical signals form digital data. For example, a physical layer may refer to a layer that defines how modulated radio frequency (RF) symbols form a frame of digital data. A data link layer, which may also be referred to as link layer, may refer to an abstraction used prior to physical layer processing at a sending side and after physical layer reception at a receiving side. It should be noted that a sending side and a receiving side are logical roles and a single device may operate as both a sending side in one instance and as a receiving side in another instance. Each of an application layer, a presentation layer, a session layer, a transport layer, and a network layer may define how data is delivered for use by a user application.

Transmission standards may include a content delivery protocol model specifying supported protocols for each layer and further defining one or more specific layer implementations. For example, ATSC Candidate Standard: System Discovery and Signaling (Doc. A/321 Part 1), Doc. S32-231r4, 6 May 2015 (hereinafter "A/321"), which is incorporated by reference in its entirety, describes specific proposed aspects of an ATSC 3.0 unidirectional physical layer implementation. Further, a corresponding link layer for the ATSC 3.0 unidirectional physical layer implementation is currently under development. Aspects of ATSC 3.0 currently under development are described in Working Drafts (WD), which may include proposed aspects for inclusion in a published ("final") version of an ATSC 3.0 standard. The proposed link layer abstracts various types of data encapsulated in particular packet types (e.g., MPEG-Transport Stream (MPEG-TS) packets, IPv4 packets, etc.) into a single generic format for processing by a physical layer. In one example, an MPEG-TS may be defined as a standard container format for transmission and storage of audio, video, and Program and System Information Protocol (PSIP) data. Additionally, the proposed link layer supports segmentation of a single upper layer packet into multiple link layer packets and concatenation of multiple upper layer packets into a single link layer packet.

The proposed ATSC 3.0 suite of standards also support so-called broadband physical layers and data link layers to enable support for hybrid video services. For example, it may be desirable for a primary presentation of a sporting event to be received by a receiving device through an over-the-air broadcast and a second video presentation and an enhancement associated with the sporting event (e.g., a team specific second camera view and a caption service including updated statistics or an enhanced presentation) to be received from a stream provided by an online media service provider. Higher layer protocols may describe how the multiple video services included in a hybrid video service may be synchronized for presentation. It should be noted that although ATSC 3.0 uses the term "broadcast" to refer to a unidirectional over-the-air transmission physical layer, the so-called ATSC 3.0 broadcast physical layer supports video delivery through streaming or file download. As such, the term broadcast as used herein should not be used to limit the manner in which video and associated data may be transported according to one or more techniques of this disclosure.

Referring again to FIG. 1, an example content delivery protocol model is illustrated. In the example illustrated in FIG. 1, content delivery protocol model 100 is "aligned" with the 7-layer OSI model for illustration purposes. It should be noted however that such an illustration should not be construed to limit implementations of the content delivery protocol model 100 or the techniques described herein. Content delivery protocol model 100 may generally correspond to the current content delivery protocol model proposed for the ATSC 3.0 suite of standard. However, as described in detail below, the techniques described herein may be incorporated into a system implementation of content delivery protocol model 100 in order to enable and/or enhance functionality in an interactive video distribution environment.

Figure 3:
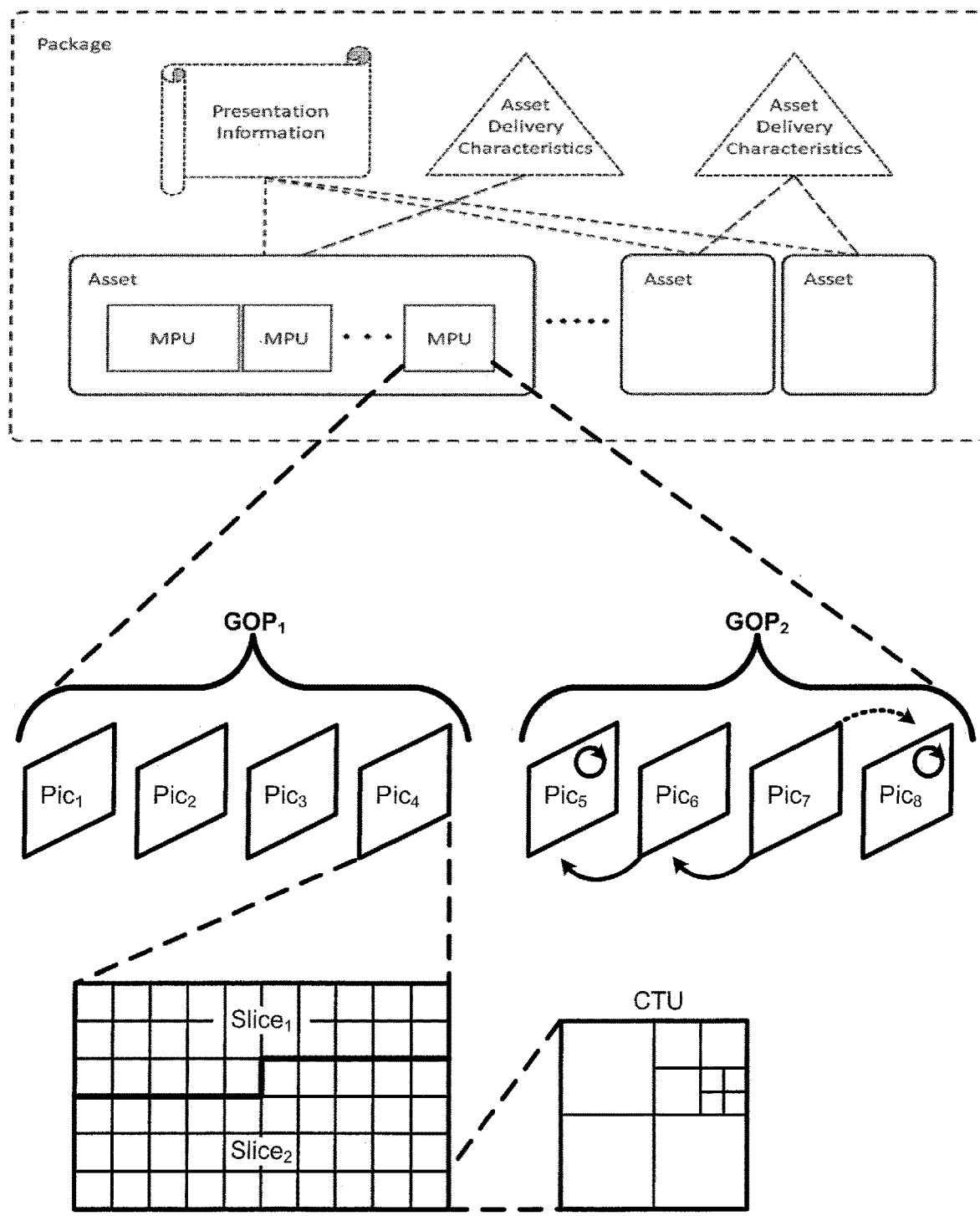
FIG. 3 is a conceptual diagram illustrating an example of encapsulating encoded video data into a transport package according to one or more techniques of this disclosure.

Referring to FIG. 1, content delivery protocol model 100 includes two options for supporting streaming and/or file download through ATSC Broadcast Physical layer: (1) MPEG Media Transport Protocol (MMTP) over User Datagram Protocol (UDP) and Internet Protocol (IP) and (2) Real-time Object delivery over Unidirectional Transport (ROUTE) over UDP and IP. MMTP is described in ISO/IEC: ISO/IEC 23008-1, "Information technology-High efficiency coding and media delivery in heterogeneous environments-Part 1: MPEG media transport (MMT)," which is incorporated by reference herein in its entirety. As illustrated in FIG. 1, in the case where MMTP is used for streaming video data, (or data associated with video data, e.g., a caption service), video data may be encapsulated in a Media Processing Unit (MPU). MMTP defines a MPU as "a media data item that may be processed by an MMT entity and consumed by the presentation engine independently from other MPUs." As illustrated in FIG. 3 and described in further detail below, a logical grouping of MPUs may form an MMT asset, where MMTP defines an asset as "any multimedia data to be used for building a multimedia presentation. An asset is a logical grouping of MPUs that share the same asset identifier for carrying encoded media data." One or more assets may form a MMT package, where a MMT package is a logical collection of multimedia content. As further illustrated in FIG. 1, in the case where MMTP is used for downloading video data, video data may be encapsulated in an International Standards Organization (ISO) based media file format (ISOBMFF). An example of an ISOBMFF is described in ISO/IEC FDIS 14496-15:2014(E): Information technology—Coding of audio-visual objects—Part 15: Carriage of network abstraction layer (NAL) unit structured video in ISO base media file format ("ISO/IEC 14496-15"), which is incorporated by reference in its entirety. MMTP describes a so-called ISOBMFF-based MPU. In this case, an MPU may include a conformant ISOBMFF file.

As described above, the ATSC 3.0 suite of standards seeks to support multimedia presentations including multiple video elements. Examples of multimedia presentations including multiple video elements include multiple camera views (e.g., sport event example described above), three dimensional presentations through multiple views (e.g., left and right video channels), temporal scalable video presentations (e.g., a base frame video presentation and enhanced frame rate video presentations), spatial and quality scalable video presentations (a High Definition video presentation and an Ultra High Definition video presentation), multiple audio presentations (e.g., native language in primary presentation and other audio tracks in other presentations), and the like. In one example, each video element (or audio track) may correspond to an asset in an MMT package.

Digital video may be encoded according to a video coding standard. Examples of video coding standards include High-Efficiency Video Coding (HEVC), ITU-T H.265 which is described in ITU-T, "High Efficiency Video Coding," Recommendation ITU-T H.265 (October 2014), and Advanced Video Coding (AVC), ITU-T H.264, which is described in ISO/IEC 14496-10-MPEG-4 Part 10, Advanced Video Coding, each of which is incorporated by reference in its entirety. One example video coding standard includes the so-called High-Efficiency Video Coding (HEVC) standard. As used herein an HEVC video coding standard may include final and draft versions of the HEVC video coding standard and various draft and/or final extensions thereof. Recommendation ITU-T H.265 (October 2014) (herein "ITU-T H.265") maintained by the International Telecommunication Union (ITU) and corresponding ISO/IEC 23008-2 MPEG-H maintained by ISO, each of which are incorporated by reference in their entirety. It should be noted that although HEVC is described herein with reference to ITU-T H.265, such descriptions should not be construed to limit scope of the techniques described herein.

Video content typically includes video sequences comprised of a series of frames. A series of frames may also be referred to as a group of pictures (GOP). Each video frame or picture may include a plurality of slices, where a slice includes a plurality of video blocks. A video block may be defined as the largest array of pixel values (also referred to as samples) that may be predictively coded. Video blocks may be ordered according to a scan pattern (e.g., a raster scan). A video encoder may perform predictive encoding on video blocks and sub-divisions thereof. HEVC specifies a coding tree unit (CTU) structure where a picture may be split into CTUs of equal size and each CTU may include coding tree blocks (CTB) having 16×16, 32×32, or 64×64 luma samples. An example of partitioning a group of pictures into CTBs is illustrated in FIG. 3.

As illustrated in FIG. 3, a video sequence includes GOP1 and GOP2, where pictures Pic1-Pic4 are included in GOP1 and pictures Pic5-Pic8 are included in GOP2. Pic4 is partitioned into slice 1 and slice2, where each of slice 1 and slice2 includes consecutive CTUs according to a left-to-right top-to-bottom raster scan. FIG. 3 also illustrates the concept of I slices, P slices, or B slices with respect to GOP2. The arrows associated with each of Pic5-Pic8 in GOP2 indicate whether a picture includes intra prediction (I) slices, unidirectional inter prediction (P) slices, or bidirectional inter prediction (B) slices. In the example of FIG. 3 pictures Pic5 and Pic9 represent pictures including I slices (i.e., references are within the picture itself), picture Pic6 represents a picture including P slices (i.e., each reference a previous picture) and picture Pic7 represents a picture including B slices (i.e., references a previous and a subsequent picture).

ITU-T H.265 defines support for multi-layer extensions, including format range extensions (RExt) (described in Annex A of ITU-T H.265), scalability (SHVC) (described in Annex H of ITU-T H.265), and multi-view (MV-HEVC) (described in Annex G of ITU-T H.265). In ITU-T H.265 in order to support multi-layer extensions a picture may reference a picture from a group of pictures other than the group of pictures the picture is included in (i.e., may reference another layer). For example, an enhancement layer (e.g., a higher quality) picture may reference a picture from a base layer (e.g., a lower quality picture). Thus, it some examples, in order to provide multiple video presentations it may be desirable to include multiple ITU-T H.265 coded video sequences in a MMT package.

Figure 2:
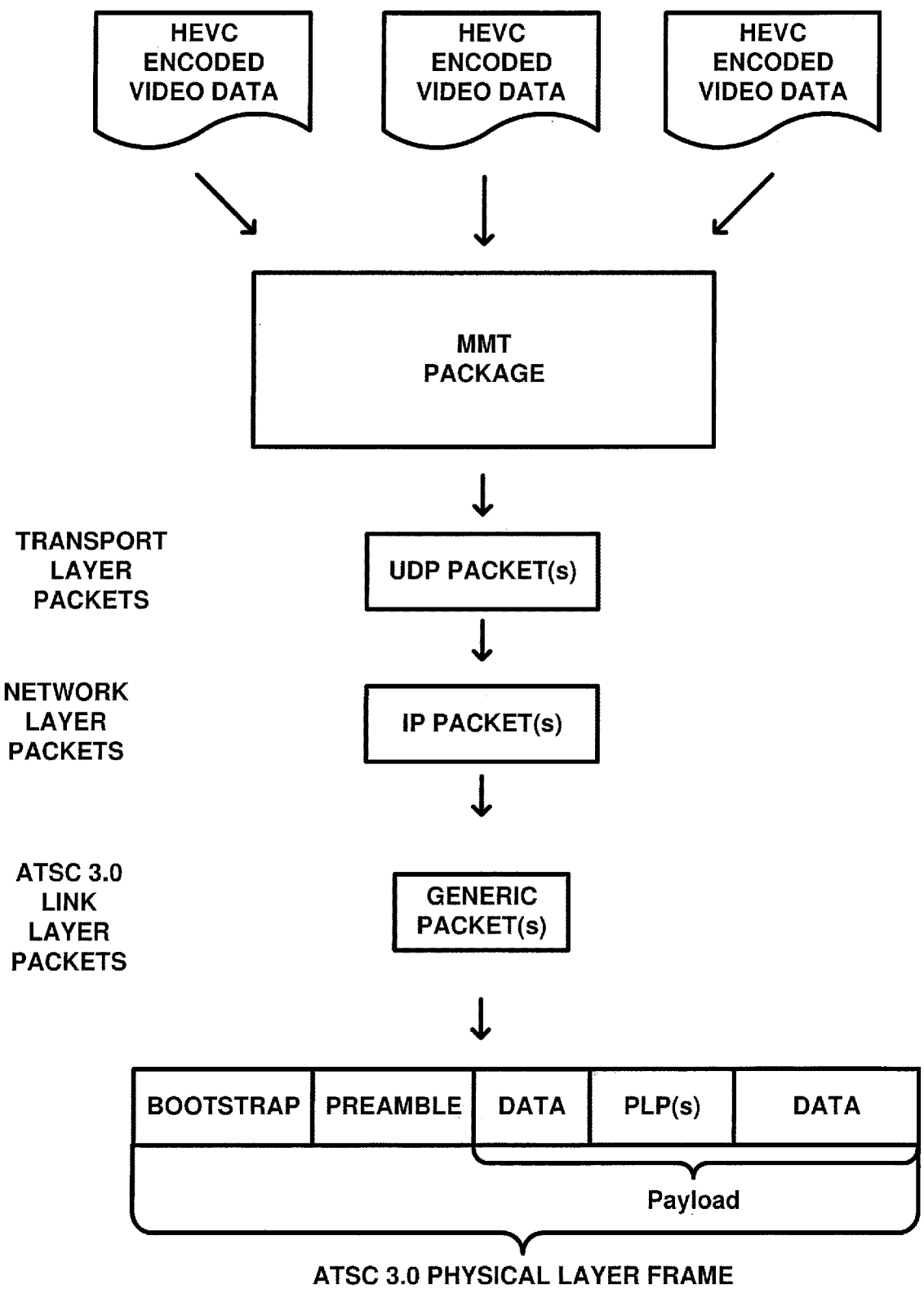
FIG. 2 is a conceptual diagram illustrating an example of generating a signal for distribution over a unidirectional communication network according to one or more techniques of this disclosure.

FIG. 2 is a conceptual diagram illustrating an example of encapsulating sequences of HEVC encoded video data in a MMT package for transmission using an ATSC 3.0 physical frame. It should be noted that in other examples, encoded video data may include video data encoding according to other video coding techniques (e.g., AVC), including video coding techniques currently under development (e.g., so-called "H.266"). In the example illustrated in FIG. 2, a plurality of encoded video data layers and segments are encapsulated in a MMT package. FIG. 3 includes additional detail of an example of how HEVC encoded video data may be encapsulated in a MMT package. The encapsulation of video data, including HEVC video data, in a MMT package is described in greater detail below. Referring again to FIG. 2, the MMT package is encapsulated into network layer packets, e.g., IP data packet(s). Network layer packets are encapsulated into link layer packets, i.e., generic packet(s). Network layer packets are received for physical layer processing. In the example illustrated in FIG. 2, physical layer processing includes encapsulating generic packet(s) in a physical layer pipe (PLP). In one example, a PLP may generally refer to a logical structure including all or portions of a data stream. In the example illustrated in FIG. 2, the PLP is included within the payload of a physical layer frame.

As provided in ISO/IEC 23008-1, MMT content is composed of Media Fragment Units (MFU), MPUs, MMT assets, and MMT Packages. In order to produce MMT content, encoded media data is decomposed into MFUs, where MFUs may correspond to access units or slices of encoded video data or other units, which can be independently decoded. One or more MFUs may be combined into a MPU.

In HEVC each of a video sequence, a GOP, a picture, a slice, and CTU may be associated with syntax data that describes video coding properties. For example, ITU-T H.265 provides the following parameter sets:

video parameter set (VPS): A syntax structure containing syntax elements that apply to zero or more entire coded video sequences (CVSs) as determined by the content of a syntax element found in the SPS referred to by a syntax element found in the PPS referred to by a syntax element found in each slice segment header.

sequence parameter set (SPS): A syntax structure containing syntax elements that apply to zero or more entire CVSs as determined by the content of a syntax element found in the PPS referred to by a syntax element found in each slice segment header.

picture parameter set (PPS): A syntax structure containing syntax elements that apply to zero or more entire coded pictures as determined by a syntax element found in each slice segment header.

where a coded video sequence includes a sequence of access units, where in ITU-T H.265 a sequence of access units is defined based on the following definitions:

access unit: A set of NAL units that are associated with each other according to a specified classification rule, . . . consecutive in decoding order . . . .

network abstraction layer (NAL) unit: A syntax structure containing an indication of the type of data to follow and bytes containing that data in the form of an raw byte sequence payload (RBSP) interspersed as necessary with emulation prevention bytes.

layer: A set of video coding layer (VCL) NAL units that all have a particular value of nuh_layer_jd and the associated non-VCL NAL units, or one of a set of syntactical structures having a hierarchical relationship.

It should be noted that the term "access unit" as used with respect ITU-T H.265 should not be confused with the term "access unit" used with respect to MMT (i.e., the two types of access units are not necessarily equivalent). As used herein the term access unit may refer either to an ITU-T H.265 access unit, a MMT access unit, or may more generally refer to a data structure. In ITU-T H.265 in some instances parameter sets may be encapsulated as a special type of NAL unit or may be signaled as a message. In some instances, it may be beneficial for a receiving device to be able to access to video parameters prior to decapsulating NAL units or ITU-T H.265 messages. Further, in some cases, syntax elements included in ITU-T H.265 parameters sets may include information that is not useful for a particular type of receiving device or application.

The techniques described herein provide video parameter signaling techniques that may increase transmission efficiency e and processing efficiency at a receiving device. Increasing transmission efficiency may result in significant cost savings for network operators. In additional to including a coded video sequence, an MPU may include a caption service associated with a coded video sequence. It should be noted that in some examples, a caption service may be associated with a video and/or audio service that is delivered to a receiving device using a broadcast, streaming, and/or file download mechanism. That is, for example, a caption service encapsulated in a MMT presentation may be associated with a video and/or audio service delivered through a broadcast mechanism.

A caption service (or asset) may generally refer to text or graphics intended to be displayed in conjunction with a video presentation (e.g., subtitles corresponding to dialogue, subtitles providing additional commentary, statistics associated with a sporting event, news headlines, stock quotes, and the like). In some examples, caption services may be described based on one or more of the following types of caption services information:

Language: the dominant language of the closed caption text. In one example, the dominant language may represent the language that will be presented to a viewer e.g. during selection. In one example, the dominant language represents the most used language within the corresponding caption.

Role: the purpose of the closed caption text, e.g., main, alternate, commentary.

Display aspect ratio: the display aspect ratio assumed by the caption authoring in formatting the caption windows and contents.

Easy reader: an indicator that indicates that the closed caption text tailored to the needs of beginning readers Profile: an indicator that indicates whether text or image profile is used.

3D support: an indicator that indicates that the closed caption text tailored for both 2D and 3D video.

It should be noted that in one example, a role may additionally identify the intended purpose of a caption service, e.g., main may identify that the caption is meant for the hard of hearing. In another example, a purpose of a caption service may be signaled separately from a role. Referring to FIG. 3, in addition to including one or more assets, a MMT package includes presentation information (PI) and asset delivery characteristics (ADC). Presentation information includes documents (PI documents). A PI document may be delivered as one or more signalling messages. Asset delivery characteristics describe the quality of service (QoS) requirements and statistics of assets for delivery. As illustrated in FIG. 3, PIs and ADCs may be associated with one or more assets and MPUs encapsulated therein.

MMT specifies a signalling function that defines a set of message formats for signalling messages. MMT specifies message formats for carrying signalling tables, descriptors or delivery related information. Table 1 provides the syntax of the general format of MMT signalling messages. It should be noted that in Table 1, and other tables included in this description, uimsbf refers to an unsigned integer most significant bit first data type.

TABLE 1

| Syntax | Value | No. of bits | Mnemonic |
|---|---|---|---|
| signalling_message ( ) { | | | |
|    message_id | | 16 | uimsbf |
|    version | | 8 | uimsbf |
|    if(message_id != PA_message && message_id != MPI_message) { | | | |
|       length | | 16 | uimsbf |
|    } else { | | | |
|       length | | 32 | uimsbf |
|    } | | | |
|    extension | | | |
|    message_payload { | | | |
|    } | | | |
| } | | | |

MMT provides the following definitions for syntax elements message_id, version, length, extension, message_payload:

message_id—this field indicates the identifier of the signalling message. [In one example] Valid message identifier values are listed in Table 34 [of MMT].

version—this field indicates the version of the signalling message. Both MMT sending entity and MMT receiving entity can verify whether a received message has a new version of not.

length—this field indicates the length of the signalling message. This field for all signalling message except Package Access (PA) messages and Media Presentation Information (MPI) message is 2 bytes long. The length of PA messages and MPI messages is 4 bytes long because it is expected that occasionally an MPI table whose length cannot be expressed by a 2 bytes length fields. Also note that a PA message includes at least one MPI table.

extension—this field provides extension information for signalling messages that require extension. The content and length of this field are specified for these signalling messages.

message_payload—the payload of the signalling message. The format of this field can be identified by the value of the message_id field.

As illustrated in Table 1 a message may be identified using a message identifier value. In MMT, message identifier values of 0x8000 to 0xFFFF are reserved for private use. Current proposals for the ATSC 3.0 suite of standards define a MMT signaling message (e.g., mmt_atsc3_message( )), where a MMT signaling message is defined to deliver information specific to ATSC 3.0 services. A MMT signaling message may be identified using a MMT message identifier value reserved for private use (e.g., a value of 0x8000 to 0xFFFF). Table 2A provides example syntax for a MMT signaling message mmt_atsc3_message( ).

from the beginning of the next field to the last byte of the mmt_atsc3_message( ).

service_id—A 16-bit unsigned integer field that shall associate the message payload with the service identified in the serviceId attribute given in the Service Labeling Table (SLT).

atsc3_message_content_type—A 16-bit unsigned integer field that shall uniquely identify the type of message content in the mmt_atsc3_message( ) payload. In one example, atsc3_message_content_type may be coded per Table 2B below. It should be noted that in other examples, other values may be used to identify a Caption Asset Descriptor type of message, e.g., any of 0x009-0xFFFF. In one example, a different value may be used for different caption asset descriptor types of message(s) e.g. past and a current version of the caption asset descriptor type of message(s). Further, it should be noted that message types may be defined according to ATSC 3.0 suite of standards.

TABLE 2A

| Syntax | No. of Bits | Format |
|---|---|---|
| mmt_atsc3_message( ) { | | |
|     message_id | 16 | uimsbf |
|     version | 8 | uimsbf |
|     length | 32 | uimsbf |
|     message payload { | | |
|         service_id | 16 | uimsbf |
|         atsc3_message_content_type | 8 | uimbsf |
|         atsc3_message_content_version | 8 | uimbsf |
|         atsc3_message_content_compression | 8 | uimbsf |
|         URI_length | 8 | uimbsf |
|         for (i=0;i< URI_length;i++) { | | |
|           URI_byte | 8 | uimsbf |
|         } | | |
|         atsc3_message_content_length | 32 | uimsbf. |
|         for (i=0;i<atsc3_message_content_length;i++) { | | |
|           atsc3_message_content_byte | 8 | uimsbf |
|         } | | |
|         for (i=0;i<length-10-URI_length-atsc3_message_content_length) { | | |
|           Reserved | 8 | uimsbf |
|         } | | |
|     } | | |
| } | | |

Current proposals for the ATSC 3.0 suite of standards provide the following definitions for syntax elements message_id, version, length, service_id, atsc3_message_content_type, atsc3_message_content_version, atsc3_message_content_compression, URI_length, URI_byte, atsc3_message_content_length, atsc3_message_content_byte, and reserved:

message_id—A 16-bit unsigned integer field that shall uniquely identify the mmt_atsc3_message( ). The value of this field shall be 0x8000.

version—An 8-bit unsigned integer field that shall be incremented by 1 any time there is a change in the information carried in this message. When the version field reaches its maximum value of 255, its value shall wraparound to 0.

length—A 32-bit unsigned integer field that shall provide the length of mmt_atsc3_message( ) in bytes, counting

TABLE 2B

| atsc3_message_content_type | Meaning |
|---|---|
| 0x0000 | Reserved |
| 0x0001 | A User Service Bundle, Description Fragment for MMT |
| 0x0002 | An Media Presentation Descriptor (MPD) |
| 0x0003 | An Application Information Table |
| 0x0004 | Application Event Information |
| 0x0005 | Video Stream Properties Descriptor |
| 0x0006 | An ATSC Staggercast Descriptor |
| 0x0007 | An Inband Event Descriptor |
| 0x0008 | A Caption Asset Descriptor |
| 0x009-0xFFFF | Reserved for future use | atsc3_message_content_version—An 8-bit unsigned integer field that shall be incremented by 1 any time there is a change in the atsc3_message content identified by a service_id and atsc_message_content_type pair. When the atsc3_message_content_version field reaches its maximum value, its value shall wraparound to 0.

atsc3_message_content_compression—An 8-bit unsigned integer field that shall identify the type of compression applied to the data in atsc3_message_content_byte.

URI_length—An 8-bit unsigned integer field that shall provide the length of the Universal Resource Identifier (URI) uniquely identifying the message payload across services. If the URI is not present, the value of this field shall be set to 0.

URI_byte—An 8-bit unsigned integer field that shall contain a UTF-8 [where UTF is an acronym of unicode transformation format] character of the URI associated with the content carried by this message excluding the terminating null character, as per Internet Engineering Task Force (IETF) Request for Comments (RFC) 3986. This field when present shall be used to identify delivered message payloads. The URI can be used by system tables to reference tables made available by delivered message payloads.

atsc3_message_content_length—A 32-bit unsigned integer field that shall provide the length of the content carried by this message.

atsc3_maesage_content_byte—An 8-bit unsigned integer field that shall contain a byte of the content carried by this message.

It has been proposed for the ATSC 3.0 suite of standards that caption services be described by an mmt_atsc3_message( ) with a caption service information message payload (i.e., service_id includes a serviceId attribute identifying caption services, e.g., service_id equals a value specifying a service described by Caption_service_information). Further, it has been proposed for the ATSC 3.0 suite of standards that caption assets be described by an mmt_atsc3_message( ) having a atsc3_message_content_type of Caption Asset Descriptor. Current techniques (e.g., as described in the current proposals) for providing caption service (or asset) information for the ATSC 3.0 suite of standards may be less than ideal. It should be noted that although the techniques described herein are described with respect to MMTP, the techniques described herein are general applicable regardless of a particular applicant transport layer implementation. For example, the techniques described herein may be applicable to Dynamic Adaptive Streaming over Hyper-Text Transport Protocol (HTTP) (DASH).

ISO/IEC 14496-15 specifies formats of elementary streams for storing a set of Network Abstraction Layer (NAL) units defined according to a video coding standard (e.g., NAL units as defined by ITU-T H.265). In ISO/IEC 14496-15 a stream is represented by one or more tracks in a file. A track in ISO/IEC 14496-15 may generally correspond to a layer as defined in ITU-T H.265. In ISO/IEC 14496-15 tracks include samples, where a sample is defined as follows:

Sample: A sample is an access unit or a part of an access unit, where an access unit is as defined in the appropriate specification (e.g., ITU-T H.265).

In ISO/IEC 14496-15 tracks may be defined based on constraints with respect to the types of NAL units included therein. That is, in ISO/IEC 14496-15, a particular type of track may be required to include particular types of NAL units, may optionally include other types of NAL units, and/or may be prohibited from including particular types of NAL units. For example, in ISO/IEC 14496-15 tracks included in a video stream may be distinguished based on whether or not a track is allowed to include parameter set (e.g., VPS, SPS, and PPS described above). For example, ISO/IEC 14496-15 provides the following with respect to an HEVC video stream "for a video stream that a particular sample entry applies to, the video parameter set, sequence parameter sets, and picture parameter sets, shall be stored only in the sample entry when the sample entry name is 'hvc1', and may be stored in the sample entry and the samples when the sample entry name is 'hev1'." In this example, a 'hvc1' access unit is required to includes NALs of types that include parameter sets and 'hev1' access unit may, but is not required to include NAL of types that include parameter set.

As described above, ITU-T H.265 defines support for multi-layer extensions. ISO/IEC 14496-15 defines an L-HEVC stream structure that is represented by one or more video tracks in a file, where each track represents one or more layers of the coded bitstream. Tracks included in an L-HEVC stream may be defined based on constraints with respect to the types of NAL units included therein. Table 3A below provides a summary of example of track types for HEVC and L-HEVC stream structures (i.e. configurations) in ISO/IEC 14496-15.

TABLE 3A

| Track Type | Applicable Configuration | Meaning |
| --- | --- | --- |
| 'hvc1' or 'hev1' | HEVC Configuration Only | A plain HEVC track without NAL units with nuh_layer_id greater than 0; Extractors and aggregators shall not be present. |
| 'hvc1' or 'hev1' | HEVC and L-HEVC Configurations | An L-HEVC track with both NAL units with nuh_layer_id equal to 0 and NAL units with nuh_layer_id greater than 0; Extractors and aggregators may be present; Extractors shall not reference NAL units with nuh_layer_id equal to 0; Aggregators shall not contain but may reference NAL units with nuh_layer _id equal to 0. |
| 'hvc2' or 'hev2' | HEVC Configuration Only | A plain HEVC track without NAL units with nuh_layer_id greater than 0; Extractors may be present and used to reference NAL units; Aggregators may be present to contain and reference NAL units. |
| 'hvc2' or 'hev2' | HEVC and L-HEVC Configurations | An L-HEVC track with both NAL units with nuh_layer_id equal to 0 and NAL units with nuh_layer_id greater than 0; Extractors and aggregators may be present; Extractors may |

TABLE 3A-continued

| Track Type | Applicable Configuration | Meaning |
|---|---|---|
| 'lhv1', 'lhe1' | L-HEVC Configuration Only | reference, any NAL units; Aggregators may both contain and reference any NAL units. An L-HEVC track without NAL units with nuh_layer_id equal to 0; Extractors may be present and used to reference NAL units; Aggregators may be present to contain and reference NAL units. |

In Table 3A, aggregators may generally refer to data that may be used to group NAL units that belong to the same sample (e.g., access unit) and extractors may generally refer to data that may be used to extract data from other tracks. A nuh_layer_id refers to an identifier that specifies the layer to which a NAL unit belongs. In one example, nuh_layer_id in Table 3A may be based on nuh_layer_id as defined in ITU-T H.265. IUT-U H.265 defines nuh_layer_id as follows:

nuh_layer_id specifies the identifier of the layer to which a VCL NAL unit belongs or the identifier of a layer to which a non-VCL NAL unit applies. The value of nuh_layer_id shall be in the range of 0 to 62, inclusive.

It should be noted that a nuh_layer_id value of 0 typically corresponds to a base layer and a nuh_layer_id greater than 0 typically corresponds to an enhancement layer. For the sake of brevity, a complete description of each of the track types included in Table 3A is not provided herein, however, reference is made to ISO/IEC 14496-15. Referring to FIG. 1, ATSC 3.0 may support an MPEG-2 TS, where an MPEG-2 TS, refers to an MPEG-2 Transport Stream (TS) and may include a standard container format for transmission and storage of audio, video, and Program and System Information Protocol (PSIP) data. ISO/IEC 13818-1, (2013), "Information Technology—Generic coding of moving pictures and associated audio—Part 1: Systems," including FDAM 3-"Transport of HEVC video over MPEG-2 systems," described the carriage of HEVC bitstreams over MPEG-2 Transport Streams.

Figure 4:
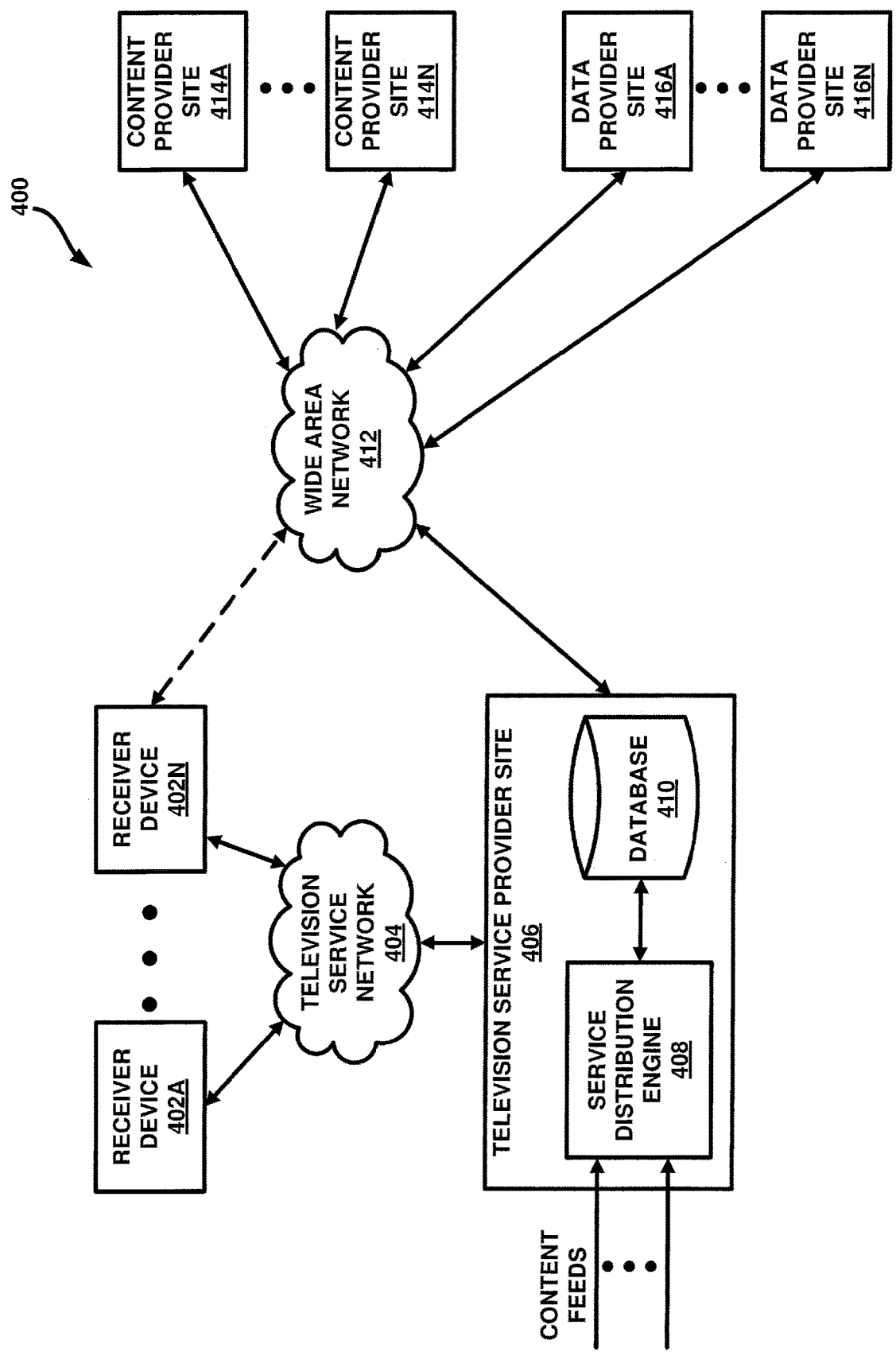
FIG. 4 is a block diagram illustrating an example of a system that may implement one or more techniques of this disclosure.

FIG. 4 is a block diagram illustrating an example of a system that may implement one or more techniques described in this disclosure. System 400 may be configured to communicate data in accordance with the techniques described herein. In the example illustrated in FIG. 4, system 400 includes one or more receiver devices 402A-402N, television service network 404, television service provider site 406, wide area network 412, one or more content provider sites 414A-414N, and one or more data provider sites 416A-416N. System 400 may include software modules. Software modules may be stored in a memory and executed by a processor. System 400 may include one or more processors and a plurality of internal and/or external memory devices. Examples of memory devices include file servers, file transfer protocol (FTP) servers, network attached storage (NAS) devices, local disk drives, or any other type of device or storage medium capable of storing data. Storage media may include Blu-ray discs, DVDs, CD-ROMs, magnetic disks, flash memory, or any other suitable digital storage media. When the techniques described herein are implemented partially in software, a device may store instructions for the software in a suitable, non-transitory computer-readable medium and execute the instructions in hardware using one or more processors.

System 400 represents an example of a system that may be configured to allow digital media content, such as, for example, a movie, a live sporting event, etc., and data and applications and multimedia presentations associated therewith (e.g., caption services), to be distributed to and accessed by a plurality of computing devices, such as receiver devices 402A-402N. In the example illustrated in FIG. 4, receiver devices 402A-402N may include any device configured to receive data from television service provider site 406. For example, receiver devices 402A-402N may be equipped for wired and/or wireless communications and may include televisions, including so-called smart televisions, set top boxes, and digital video recorders. Further, receiver devices 402A-402N may include desktop, laptop, or tablet computers, gaming consoles, mobile devices, including, for example, "smart" phones, cellular telephones, and personal gaming devices configured to receive data from television service provider site 406. It should be noted that although system 400 is illustrated as having distinct sites, such an illustration is for descriptive purposes and does not limit system 400 to a particular physical architecture. Functions of system 400 and sites included therein may be realized using any combination of hardware, firmware and/or software implementations.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of receiver devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DM B standards, Data Over Cable Service Interface Specification (DOCSIS) standards, HbbTV standards. W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. In the example illustrated in FIG. 4, television service provider site 406 includes service distribution engine 408 and database 410. Service distribution engine 408 may be configured to receive data, including, for example, multimedia content, interactive applications, and messages, and distribute data to receiver devices 402A-402N through television service network 404. For example, service distribution engine 408 may be configured to transmit television services according to aspects of the one or more of the transmission standards described above (e.g., an ATSC standard). In one example, service distribution engine 408 may be configured to receive data through one or more sources. For example, television service provider site 406 may be configured to receive a transmission including television programming through a satellite uplink/downlink. Further, as illustrated in FIG. 4, television service provider site 406 may be in communication with wide area network 412 and may be configured to receive data from content provider sites 414A-414N and further receive data from data provider sites 416A-416N. It should be noted that in some examples, television service provider site 406 may include a television studio and content may originate therefrom.

Database 410 may include storage devices configured to store data including, for example, multimedia content and data associated therewith, including for example, descriptive data and executable interactive applications. For example, a sporting event may be associated with an interactive application that provides statistical updates. Data associated with multimedia content may be formatted according to a defined data format, such as, for example, Hypertext Markup Language (HTML), Dynamic HTML, eXtensible Markup Language (XML), and JavaScript Object Notation (JSON), and may include Universal Resource Locators (URLs) and Uniform Resource Identifiers (URI) enabling receiver devices 402A-402N to access data, e.g., from one of data provider sites 416A-416N. In some examples, television service provider site 406 may be configured to provide access to stored multimedia content and distribute multimedia content to one or more of receiver devices 402A-402N through television service network 404. For example, multimedia content (e.g., music, movies, and television (TV) shows) stored in database 410 may be provided to a user via television service network 404 on a so-called on demand basis.

Wide area network 412 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3rd Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 412 may comprise any combination of wireless and/or wired communication media. Wide area network 412 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 416 may include the Internet.

Referring again to FIG. 4, content provider sites 414A-414N represent examples of sites that may provide multimedia content to television service provider site 106 and/or receiver devices 402A-402N. For example, a content provider site may include a studio having one or more studio content servers configured to provide multimedia files and/or streams to television service provider site 406. In one example, content provider sites 414A-414N may be configured to provide multimedia content using the IP suite. For example, a content provider site may be configured to provide multimedia content to a receiver device according to Real Time Streaming Protocol (RTSP), or Hyper-Text Transport Protocol (HTTP).

Data provider sites 416A-416N may be configured to provide data, including hypertext based content, and the like, to one or more of receiver devices 402A-402N and/or television service provider site 406 through wide area network 412. A data provider site 416A-416N may include one or more web servers. Data provided by data provider site 416A-416N may be defined according to data formats, such as, for example, HTML, Dynamic HTML, XML, and JSON. An example of a data provider site includes the United States Patent and Trademark Office website. It should be noted that in some examples, data provided by data provider sites 416A-416N may be utilized for so-called second screen applications. For example, companion device(s) in communication with a receiver device may display a website in conjunction with television programming being presented on the receiver device. It should be noted that data provided by data provider sites 416A-416N may include audio and video content.

Figure 5:
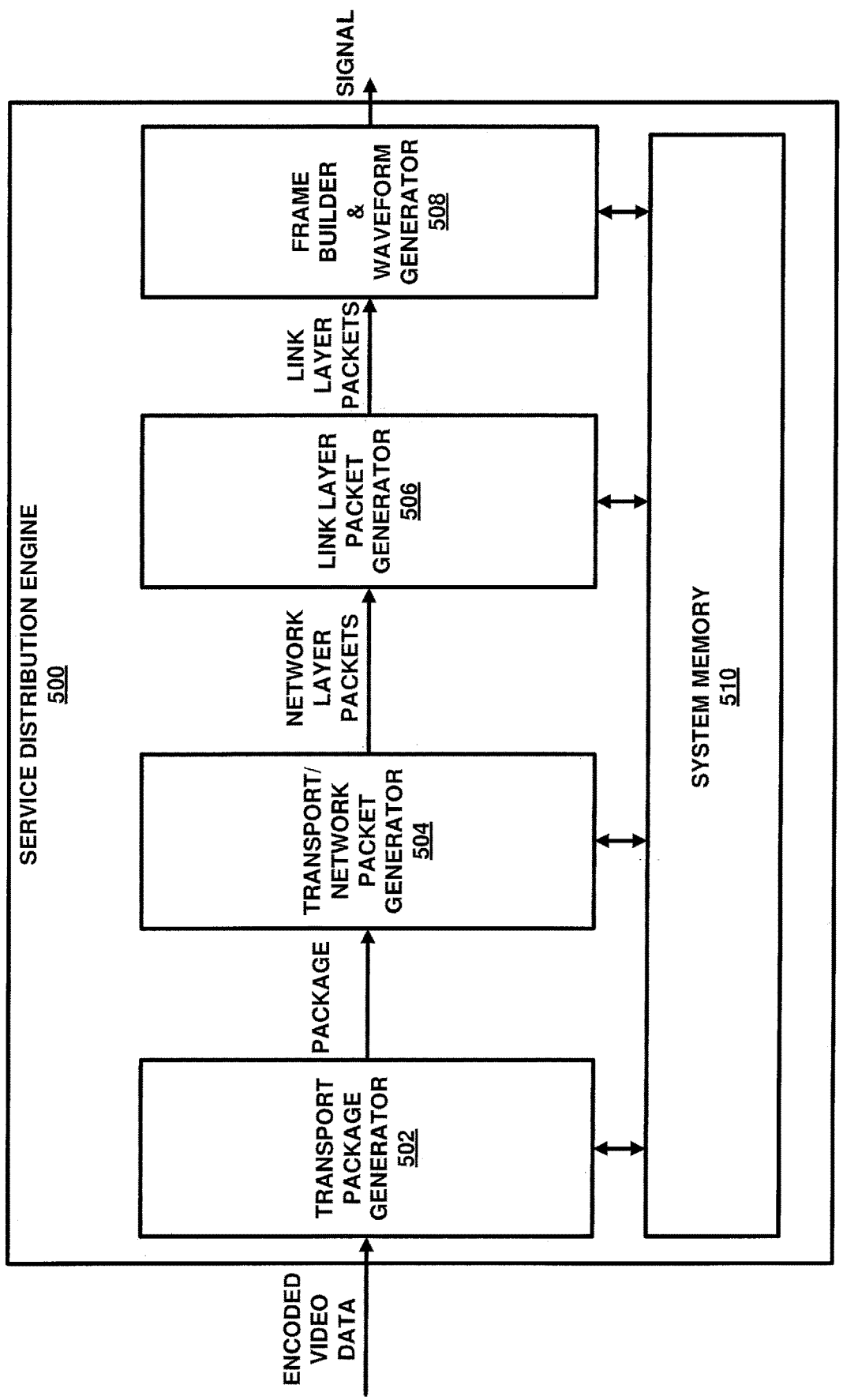
FIG. 5 is a block diagram illustrating an example of a service distribution engine that may implement one or more techniques of this disclosure.

As described above, service distribution engine 408 may be configured to receive data, including, for example, multimedia content, interactive applications, and messages, and distribute data to receiver devices 402A-402N through television service network 404. FIG. 5 is a block diagram illustrating an example of a service distribution engine that may implement one or more techniques of this disclosure. Service distribution engine 500 may be configured to receive data and output a signal representing that data for distribution over a communication network. e.g., television service network 404. For example, service distribution engine 500 may be configured to receive one or more data streams and output a signal that may be transmitted using a single radio frequency band (e.g., a 6 MHz channel, an 8 MHz channel, etc.) or a bonded channel (e.g., two separate 6 MHz channels). A data stream may generally refer to data encapsulated in a set of one or more data packets. In the example illustrated in FIG. 5, service distribution engine 500 is illustrated as receiving encoded video data. As described above, encoded video data may include one or more layers of HEVC encoded video data.

As illustrated in FIG. 5, service distribution engine 500 includes transport package generator 502, transport/network packet generator 504, link layer packet generator 506, frame builder and waveform generator 508, and system memory 510. Each of transport package generator 502, transport/network packet generator 504, link layer packet generator 506, frame builder and waveform generator 508, and system memory 510 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although service distribution engine 500 is illustrated as having distinct functional blocks, such an illustration is for descriptive purposes and does not limit service distribution engine 500 to a particular hardware architecture. Functions of service distribution engine 500 may be realized using any combination of hardware, firmware and/or software implementations.

System memory 510 may be described as a non-transitory or tangible computer-readable storage medium. In some examples, system memory 510 may provide temporary and/or long-term storage. In some examples, system memory 510 or portions thereof may be described as non-volatile memory and in other examples portions of system memory 510 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories. System memory 510 may be configured to store information that may be used by service distribution engine 500 during operation. It should be noted that system memory 510 may include individual memory elements included within each of transport package generator 502, transport/network packet generator 504, link layer packet generator 506, and frame builder and waveform generator 508. For example, system memory 510 may include one or more buffers (e.g., First-in First-out (FIFO) buffers) configured to store data for processing by a component of service distribution engine 500.

Transport package generator 502 may be configured to receive one or more layers of encoded video data and generate a transport package according to a defined applicant transport package structure. For example, transport package generator 502 may be configured to receive one or more HEVC layers and segments of encoded video data and generate a package based on MMTP, as described in detail below. Transport/network packet generator 504 may be configured to receive a transport package and encapsulate the transport package into corresponding transport layer packets (e.g., UDP, Transport Control Protocol (TCP), etc.) and network layer packets (e.g., IPv4, IPv6, compressed IP packets, etc.). Link layer packet generator 506 may be configured to receive network packets and generate packets according to a defined link layer packet structure (e.g., an ATSC 3.0 link layer packet structure).

Frame builder and waveform generator 508 may be configured to receive one or more link layer packets and output symbols (e.g., OFDM symbols) arranged in a frame structure. As described above, a frame may include one or more PLPs may be referred to as a physical layer frame (PHY-Layer frame). In one example, a frame structure may include a bootstrap, a preamble, and a data payload including one or more PLPs. A bootstrap may act as a universal entry point for a waveform. A preamble may include so-called Layer-1 signaling (L1-signaling). L1-signaling may provide the necessary information to configure physical layer parameters. Frame builder and waveform generator 508 may be configured to produce a signal for transmission within one or more of types of RF channels: a single 6 MHz channel, a single 7 MHz channel, single 8 MHz channel, a single 11 MHz channel, and bonded channels including any two or more separate single channels (e.g., a 14 MHz channel including a 6 MHz channel and a 8 MHz channel). Frame builder and waveform generator 508 may be configured to insert pilots and reserved tones for channel estimation and/or synchronization. In one example, pilots and reserved tones may be defined according to an OFDM symbol and sub-carrier frequency map. Frame builder and waveform generator 508 may be configured to generate an OFDM waveform by mapping OFDM symbols to sub-carriers. It should be noted that in some examples, frame builder and waveform generator 508 may be configured to support layer division multiplexing. Layer division multiplexing may refer to super-imposing multiple layers of data on the same RF channel (e.g., a 6 MHz channel). Typically, an upper layer refers to a core (e.g., more robust) layer supporting a primary service and a lower layer refers to a high data rate layer supporting enhanced services. For example, an upper layer could support basic High Definition video content and a lower layer could support enhanced Ultra-High Definition video content.

As described above, in order to provide multimedia presentations including multiple video elements, it may be desirable to include multiple HEVC coded video sequences in a MMT package. As provided in ISO/IEC 23008-1, MMT content is composed of Media Fragment Units (MFU), MPUs. MMT assets, and MMT Packages. In order to produce MMT content, encoded media data is decomposed into MFUs, where MFUs may correspond to access units or slices of encoded video data or other units, which can be independently decoded. One or more MFUs may be combined into a MPU. As described above, a logical grouping of MPUs may form an MMT asset and one or more assets may form a MMT package.

Referring to FIG. 3, in addition to including one or more assets, a MMT package includes presentation information (PI) and asset delivery characteristics (ADC). Presentation information includes documents (PI documents) that specify the spatial and temporal relationship among the assets. In some cases, a PI document may be used to determine the delivery order of assets in a package. A PI document may be delivered as one or more signaling messages. Signaling messages may include one or more tables. Asset delivery characteristics describe the quality of service (QoS) requirements and statistics of assets for delivery. As illustrated in FIG. 3, multiple assets can be associated with a single ADC.

Figure 6:
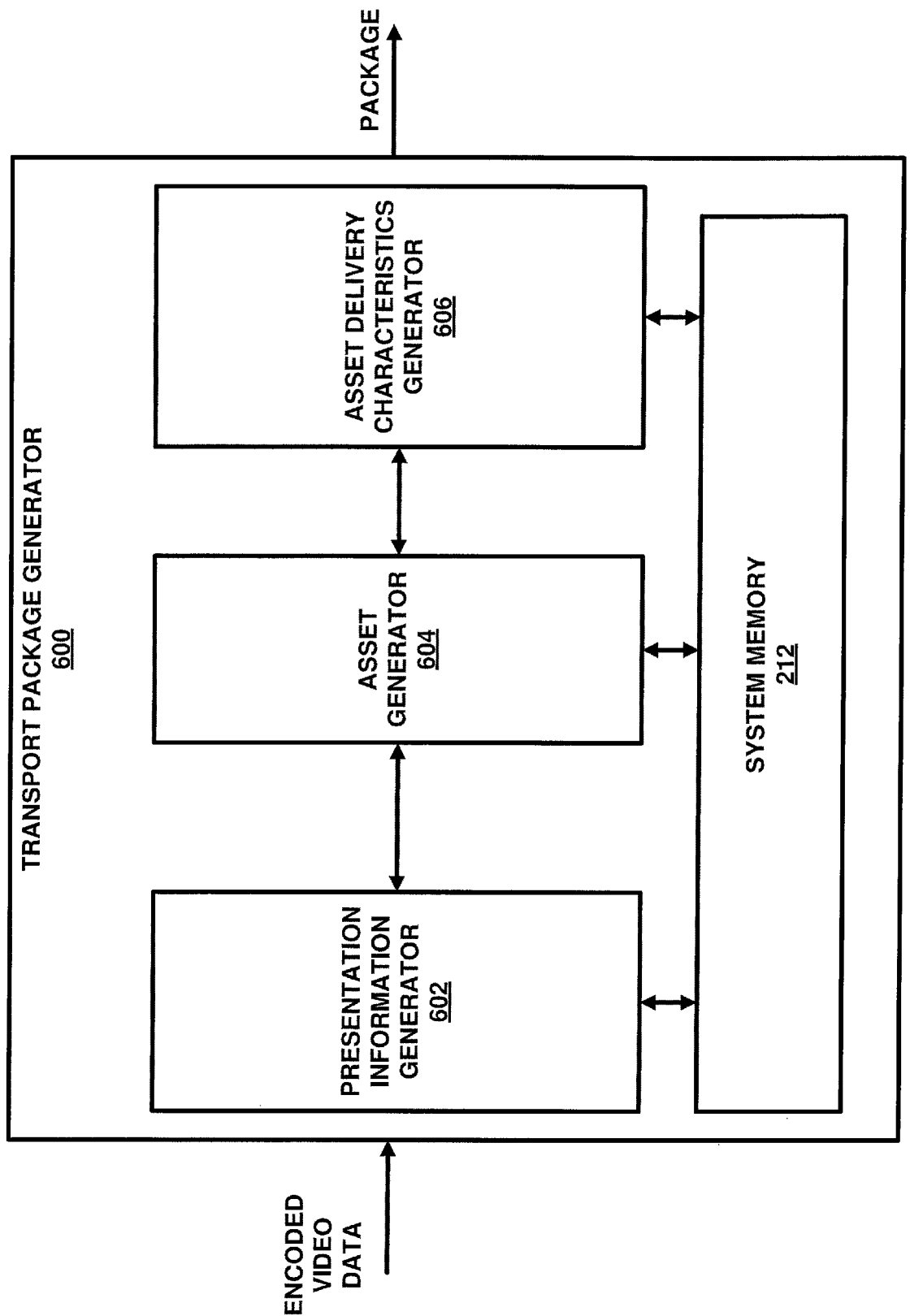
FIG. 6 is a block diagram illustrating an example of a transport package generator that may implement one or more techniques of this disclosure.

FIG. 6 is a block diagram illustrating an example of a transport package generator that may implement one or more techniques of this disclosure. Transport package generator 600 may be configured to generate a package according to the techniques described herein. As illustrated in FIG. 6, transport package generator 600 includes presentation information generator 602, asset generator 604, and asset delivery characteristic generator 606. Each of presentation information generator 602, asset generator 604, and asset delivery characteristic generator 606 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although transport package generator 600 is illustrated as having distinct functional blocks, such an illustration is for descriptive purposes and does not limit transport package generator 600 to a particular hardware architecture. Functions of transport package generator 600 may be realized using any combination of hardware, firmware and/or software implementations.

Asset generator 604 may be configured to receive encoded video data and generate one or more assets for inclusion in a package. Asset delivery characteristic generator 606 may be configured to receive information regarding assets to be included in a package and provide QoS requirements. Presentation information generator 602 may be configured to generate presentation information documents. As described above, in some instances, it may be beneficial for a receiving device to be able to access video parameters prior to decapsulating NAL units or HEVC bitstream data. In one example, transport package generator 600 and/or presentation information generator 602 may be configured to include one or more video parameters in presentation information of a package.

As described above, a presentation information document may be delivered as one or more signaling messages which may include one or more tables. One example table includes a MMT Package Table (MPT), where a MPT message is defined in ISO/IEC 23008-1 as "this message type contains an MP (MPT message) table that provides all or a part of information required for a single package consumption." Example semantics for an MP table is provided in Table 3B below.

TABLE 3B

| Syntax | Value | No. of bits | Mnemonic |
|---|---|---|---|
| MP_table( ) { | | | |
|   table_id | | 8 | uimsbf |
|   version | | 8 | uimsbf |
|   length | | 16 | uimsbf |
|   reserved | '11 1111' | 6 | bslbf |
|   MP_table_mode | | 2 | bslbf |
|   If (table_id == | | | |
|   SUBSET_0_MPT_TABLE_ID) { | N1 | | |
|     MMT_package_id { | | 8 | uimsbf |
|       MMT_package_id_length | | | |
|       for (i=0; i<N1; i++) { | | 8 | uimsbf |
|         MMT_package_id_byte | | | |
|       } | | | |
|     } | | | |
|   } | N2 | | |
|   MP_table_descriptors { | | 16 | uimsbf |
|     MP_table_descriptors_length | | | |
|     for (i=0; i<N2; i++) { | | 8 | uimsbf |
|       MP_table_descriptors_byte | | | |
|     } | | | |
|   } | | | |
| } | N3 | 8 | uimsbf |
| number_of_assets | | | |
| for (i=0; i<N3; i++) { | | | |
|   Identifier_mapping( ) | | 32 | char |
|   asset_type | '1111 11' | 6 | bslbf |
|   reserved | | 1 | bslbf |
|   default_asset_flag | | 1 | bslbf |
|   asset_clock_relation_flag | | | |
|   if (asset_clock_relation_flag == 1) { | | 8 | uimsbf |
|     asset_clock_relation_id | '1111 111' | 7 | bslbf |
|     reserved | | 1 | bslbf |
|     asset_timeseale_flag | | | |
|     if (asset_time_scale_flag == 1) { | | 32 | uimsbf |
|       asset_timescale | | | |
|     } | | | |
|   } | | | |
|   asset_location { | | | |
| | N6 | 8 | uimsbf |

TABLE 3B-continued

| Syntax | Value | No. of bits | Mnemonic |
|---|---|---|---|
|   location_count | | | |
|   for (i=0; i<N6; i++) { | | | |
|     MMT_general_location_info( ) | | | |
|   } | N5 | 16 | uimsbf |
| } | | | |
| asset_descriptors { | | 8 | uimsbf |
|   asset_deseriptors_length | | | |
|   for (j=0; j<N5; j++) { | | | |
|     asset_descriptors_byte | | | |
|   } | | | |
| } | | | |
| } | | | |
| } | | | |

Each of the syntax elements in Table 3B are described in ISO/IEC 23008-1 (e.g., with respect to Table 20 in ISO/IEC 23008-1). For the sake of brevity, a complete description of each of the syntax elements included in Table 3B is not provided herein, however, reference is made to ISO/IEC 23008-1. In Table 3B and the tables below uimsbf refers to an unsigned integer most significant bit first data type, bslbf refers to bit string left bit first data type, and char refers to a character data type. ISO/IEC 23008-1 provides the following with respect to asset_descriptors_length and asset_descriptors_byte:

asset_descrtptors_length—the number of bytes counted from the beginning of the next field to the end of the asset descriptors syntax loop.

asset_descriptors_byte—a byte in asset descriptors.

Thus, asset_descriptors syntax loop in Table 3B enables various types of descriptors to be provided for assets included in a package. In one example, transport package generator 600 may be configured to include one or more descriptors specifying video parameters in a MPT message. In one example, the descriptor may be referred to as a video stream properties descriptor. In one example, for each video asset, a video stream properties descriptor, video_stream_properties_descriptor( ) may be included within the syntax element asset_descriptors. In one example, a video stream properties descriptor, video_stream_properties_descriptor( ) may be included within the syntax element asset_descriptors only for certain video assets, for example only for video assets coded as H.265—High Efficiency Video Coding (HEVC) video assets. As described in detail below, a video stream properties descriptor may include information about one or more of: resolution, chroma format, bit depth, temporal scalability, bitrate, picture-rate, color characteristics, profile, tier, and level. As further described in detail below, in one example, normative bitstream syntax and semantics for example descriptors may include presence flags for various video stream characteristics which can be individually toggled to provide various video characteristics information.

Further, signaling of various video characteristics information may be based on the presence or absence of temporal scalability. In one example, an element may indicate if temporal scalability is used in a stream. In one example, a conditionally signaled global flag may indicate if profile, tier, or level information is present for temporal sub-layers. As described in detail below, this condition may be based on an indication of the use of temporal scalability. In one example, a mapping and condition for the presence of a MMT dependency descriptor may be based on flags signaled in a video stream properties descriptor. In one example, reserved bits and a calculation of the length for reserved bits may be used for byte alignment.

As described detail below, video_stream_properties_descriptor( ) may include syntax elements defined in ITU-T H.265 and/or variation thereof. For example, a range of values for a syntax element defined in H.265 may be limited in video_stream_properties_descriptor( ). In one example, a picture rate code element may be used to signal commonly used picture rates (frame rates). Further, in one example, a picture rate code element may include a special value to allow signaling of any picture rate value. In one example, a syntax element nuh_layer_id values may be used for an MMT asset to associate it with an asset_id for a scalable and/or multi-view stream.

Example semantics for example fields of example video_stream_properties descriptors are respectively provided in Tables 4A-4D below. It should be noted that in each of Tables 4A-4D Format values of "H.265" include formats that are based on formats provided in ITU-T H.265 and described in further detail below and "TBD" includes formats to be determined. Further in Tables 4A-4D below, var represents a variable number of bits as further defined in a referenced Table.

TABLE 4A

| Syntax | No. of Bits | Format |
|---|---|---|
| video_streamproperties_descriptor( ) { | | |
|   descriptor_tag | 8 | TBD |
|   descriptor_length | 8 | uimsbf |
|   temporal_scalability_present | 1 | bslbf |
|   scalability_info_present | 1 | bslbf |
|   multiview_info_present | 1 | bslbf |
|   res_cf_bd_info_present | 1 | bslbf |
|   pr_info_present | 1 | bslbf |
|   br_info_present | 1 | bslbf |
|   color_info_present | | |
|   Reserved | 1 | '1' |
|   if(temporal_scalability_present) { | | |
|     max_sub_layers_instream /* s */ | 6 | uimsbf |
|     sub_layer_profile_tier_level_info_present | 1 | bslbf |
|     Reserved | 1 | '1' |
|   } | | |
|   if(scalability_info_present) { | | |
|     scalability_info( ) | 8 or var | Table 5A or 5B |
|   } | | |
|   if(multiview_info_present) { | | |
|     mutiview_info( ) | 40 or var | Table 6A or 6B |
|   } | | |
|   if(res_cf_bd_info_present) { | | |
|     res_cf _bd_info( ) | 48 | Table 7A or 7B |
|   } | | |
|   if(pr_info_present) { | | |
|     if(sub_layer_profile_tier_level_info_present) { | | |
|       pr_info(max_sub_layers_instream-1) | var | Table 8A or B |
|     } else { | | |
|       pr_info(0) | var | Table 8A or 8B |
|     } | | |
|   } | | |
|   if(br_info_present) { | | |
|     if(sub_layer_profile_tier_level_info_present) { | | |
|       br_info(max_sub_layers_instream-1) | var | Table 9 |
|     } else { | | |
|       br_info(0) | var | Table 9 |
|     } | | |
|   } | | |
|   if(color_info_present) { | | |
|     color_info( ) | 24 or 32 or var | Table 10A-10F |
|   } | | |
|   if(sub_layer_profile_tier_level_info_present) { | | |
|     profile_tier_level(1, max_sub_layers_instream-1) | var | H.265 |
|   } else { | | |
|     profile_tier_level(1,0) | var | H.265 |
|   } | | |
| } | | |

TABLE 4B

| Syntax | No. of Bits | Format |
|---|---|---|
| video_streamproperties_descriptor( ) { | | |
|   descriptor_tag | 8 | TBD |
|   descriptor_length | 8 | uimsbf |
|   codec_code | 4*8 | uimsbf |
|   temporal_scalability_present | 1 | bslbf |
|   scalability_info_present | 1 | bslbf |
|   multiview_info_present | 1 | bslbf |
|   res_cf_bd_info_present | 1 | bslbf |
|   pr_info_present | 1 | bslbf |
|   br_info_present | 1 | bslbf |
|   color_info_present | | |
|   reserved | 1 | '1' |
|   if(temporal_scalability_present) { | | |
|     max_sub_layers_instream  /* s */ | 6 | uimsbf |
|     sub_layer_profile_tier_level_info_present | 1 | bslbf |
|     reserved | 1 | '1' |
|     tid_max | 3 | uimsbf |
|     tid_min | 3 | uimsbf |
|     reserved2 | 2 | '11' |
|   } | | |
|   if(scalability_info_present) { | | |
|     scalability_info( ) | 8 or var | Table 5A or 5B |
|   } | | |
|   if(multiview_info_present) { | | |
|     multiview_info( ) | 40 or var | Table 6A or 6B |
|   } | | |
|   if(res_cf_bd_info_present) { | | |
|     res_cd_bd_prop_info( ) | 48 | Table 7A or Table 7B |
|   } | | |
|   if(pr_info_present) | | |
|     if(sub_layer_profile_tier_level_info_present) { | | |
|       pr_info(max_sub_layers_instream-1) | var | Table 8A or 8B |
|     } else { | | |
|       pr_info(0) | var | Table 8A or 8B |
|     } | | |
|   } | | |
|   if(br_info_present) { | | |
|     if(sub_layer_profile_tier_level_info_present) { | | |
|       br_info(max_sub_layers_instream-1) | var | Table 9 |
|     } else { | | |
|       br_info(0) | var | Table 9 |
|     } | | |
|   } | | |
|   if(color_info_present) { | | |
|     color_info( ) | 24 or 32 or var | Table 10A-10F |
|   } | | |
|   if(sub_layer_profile_tier_level_info_present) { | | |
|     if(scalable_info_present \|\| multiview_info_present) { | | |
|       profile_tier_level(max_sub_layers_instream-1) | var | H.265 |
|     } else { | | |
|       profile_tier_level(max_sub_layers_instream-1) | var | H.265 |
|     } | | |
|   } else { | | |
|     if(scalable_info_present \|\| multiview_info_present) { | | |
|       profile_tier_level(1,0) | var | H.265 |
|     } else { | | |
|       profile_tier_level(0) | var | H.265 |
|     } | | |
|   } | | |
| } | | |

TABLE 4C

| Syntax | No. of Bits | Format |
|---|---|---|
| video_streamproperties_descriptor( ) { | | |
|   descriptor_tag | 8 | TBD |
|   descriptor_length | 8 | uimsbf |
|   codec_indicator | 8 | uimsbf |

TABLE 4C-continued

| Syntax | No. of Bits | Format |
|---|---|---|
| temporal_scalability_present | 1 | bslbf |
| scalability_info_present | 1 | bslbf |
| multiview_info_present | 1 | bslbf |
| res_cf_bd_info_present | 1 | bslbf |
| pr_info_present | 1 | bslbf |
| br_info_present | 1 | bslbf |
| color_info_present | | |
| reserved | 1 | '1' |
| if(temporal_scalability_present) { | | |
|     max_sub_layers_instream   /* s*/ | 6 | uimsbf |
|     sub_layer_profile_tier_level_info_present | 1 | bslbf |
|     reserved | 1 | '1' |
|     tid_max | 3 | uimsbf |
|     tid_min | 3 | uimsbf |
|     reserved2 | 2 | '11' |
| } | | |
| if(scalability_info_present) { | | |
|     scalability_info( ) | 8 or var | Table 5A or 5B |
| } | | |
| if(multiview_info_present) { | | |
|     multiview_info( ) | 40 or var | Table 6A or 6B |
| } | | |
| if(res_cf_bd_info_present) | | |
|     res_cf_bd_prop_info( ) | 48 | Table 7A or 7B |
| } | | |
| if(pr_info_present) | | |
|   if(sub_layer_profile_tier_level_info_present) { | | |
|     pr_info(max_sub_layers_instream-1) | var | Table 8A or 8B |
|   } else { | | |
|     pr_info(0) | var | Table 8A or 8B |
|   } | | |
| } | | |
| if(br_info_present) { | | |
|   if(sub_layer_profile_tier_level_info_present) { | | |
|     br_info(max_sub_layers_instream-1) | var | Table 9 |
|   } else { | | |
|     br_info(0) | var | Table 9 |
|   } | | |
| } | | |
| if(color_info_present) { | | |
|     color_info( ) | 24 or 32 or var | Table 10A-10F |
| } | | |
| if(sub_layer_profile_tier_level_info_present) { | | |
|   if(scalable_info_present \|\| multiview_info_present) { | | |
|     profile_tier_level(max_sub_layers_instream-1) | var | H.265 |
|   } else { | | |
|     profile_tier_level(max_sub_layers_instream-1) | var | H.265 |
|   } | | |
| } else { | | |
|   if(scalable_info_present \|\| multiview_info_present) { | | |
|     profile_tier_level(1,0) | var | H.265 |
|   } else { | | |
|     profile_tier_level(0) | var | H.265 |
|   } | | |
| } | | |
| } | | |

TABLE 4D

| Syntax | No. of Bits | Format |
|---|---|---|
| video_streamproperties_descriptor( ) { | | |
|   descriptor_tag | 8 | TBD |
|   descriptor_length | 8 | uimsbf |
|   codec_code | 4*8 | uimsbf |
|   temporal_scalability_present | 1 | bslbf |
|   scalability_info_present | 1 | bslbf |
|   multiview_info_present | 1 | bslbf |
|   res_cf_bd_info_ present | 1 | bslbf |

TABLE 4D-continued

| Syntax | No. of Bits | Format |
|---|---|---|
| pr_info_present | 1 | bslbf |
| br_info_present | 1 | bslbf |
| color_info_present | | |
| reserved | 1 | '1' |
| if(temporal_scalability_present) { | | |
|     max_sub_layers_instream  /* s */ | 6 | uimsbf |
|     sub_layer_profile_tier_level_info_present | 1 | bslbf |
|     reserved | 1 | '1' |
|     for (i=0;i<7;i++) { | | |
|         tid_present[ i ] | 1 | bslbf |
|     } | | |
|     reserved | 1 | '1' |
| } | | |
| if(scalability_info_present) { | | |
|     scalability_info( ) | 8 or var | Table 5A or 5B |
| } | | |
| if(multiview_info_present) { | | |
|     multiview_info( ) | 40 or var | Table 6A or 6B |
| } | | |
| if(res_cf_bd_info_present) { | | |
|     res_cf_bd_info( ) | 48 | Table 7A or 7B |
| } | | |
| if(pr_info_present) { | | |
|     if(sub_layer_profile_tier_level_info_present) { | | |
|         pr_info(max_sub_layers_instream-1) | var | Table 8A or 8B |
|     } else { | | |
|         pr_info(0) | var | Table 8A or 8B |
|     } | | |
| } | | |
| if(br_info_present) { | | |
|     if(sub_layer_profile_tier_level_info_present) { | | |
|         br_info(max_sub_layers_instream-1) | var | Table 9 |
|     } else { | | |
|         br_info(0) | var | Table 9 |
|     } | | |
| } | | |
| if(color_info_present) { | | |
|     color_info( ) | 24 or 32 or var | Table 10A-10F |
| } | | |
| if(sub_layer_profile_tier_level_info_present) { | | |
|     profile_tier_level(1, max_sub_layers_instream-1) | var | H.265 |
| } else { | | |
|     profile_tier_level(1,0) | var | H.265 |
| } | | |
| } | | |

Example syntax elements descriptor_tag, descriptor_length, temporal_scalability_present, scalability_info_present, multiview_info_present, res_cf_bd_info_present, pr_info_present, br_info_present, color_info_present, max_sub_layers_instream, and sub_layer_profile_tier_level_info_present, included in Tables 4A-Table 4D may be based on the following example definitions:

descriptor_tag—This 8-bit unsigned integer may have the value 0xTobedecided, identifying this descriptor. Where 0xTobedecided indicates a value to be decided. i.e. any particular fixed value may be used.

descriptor_length—This 8-bit unsigned integer may specify the length (in bytes) immediately following this field up to the end of this descriptor.

temporal_scalability_present—This 1-bit Boolean flag may indicate, when set to '1', that the elements max_sub_layers_present and sub_layer_pofile_tier_level_info_present are present and temporal scalability is provided in the asset or stream. When set to '0', the flag may indicate that the elements max_sub_layers_present and sub_layer_profile_tier_level_info_present are not present and temporal scalability is not provided in the asset or stream.

scalability_info_present—This 1-bit Boolean flag may indicate, when set to '1', that the elements in scalability_info( ) structure are present. When set to '0', the flag may indicate that the elements in scalability_info( ) structure are not present.

multiview_info_present—This 1-bit Boolean flag may indicate, when set to '1', that the elements in multiview_info( ) structure are present. When set to '0', the flag may indicate that the elements in multiview_info( ) structure are not present.

res_cf_bd_info_present—This 1-bit Boolean flag may indicate, when set to '1', that the elements in res_cf_bd_info( ) structure are present. When set to '0', the flag may indicate that the elements in res_cf_bd_info( ) structure are not present.

pr_info_present—This 1-bit Boolean flag may indicate, when set to '1', that the elements in pr_info( ) structure are present. When set to '0', the flag may indicate that the elements in pr_info( ) structure are not present.

br_info_present—This 1-bit Boolean flag may indicate, when set to '1', that the elements in br_info( ) structure are present. When set to '0', the flag may indicate that the elements in br_info( ) structure are not present.

color_info_present—This 1-bit Boolean flag may indicate, when set to '1', that the elements in color_info( ) structure are present. When set to '0', the flag may indicate that the elements in color_info( ) structure are not present.

max_sub_layers_instream—This 6-bit unsigned integer may specify the maximum number of temporal sub-layers that may be present in each Coded Video Sequence (CVS) in the asset or video stream. In another example this 6-bit unsigned integer may specify the maximum number of temporal sub-layers that are present in each Coded Video Sequence (CVS) in the asset or video stream. The value of max_sub_layers_instream may be in the range of 1 to 7, inclusive.

sub_layer_profile_tier_level_info_present—This 1-bit Boolean flag may indicates, when set to '1', that the profile, tier, level information may be or is present for temporal sub-layers in the asset or video stream. When set to '0', the flag may indicate that the profile, tier, level information is not present for temporal sub-layers in the asset or video stream. When not present sub_layer_profile_tier_level_info_present may be inferred to be equal to 0.

As illustrated above, in addition to including example syntax elements descriptor_tag, descriptor_length, temporal_scalability_present, scalability_info_present, multiview_info_present, res_cf_bd_info_present, pr_info_present, br_info_present, color_info_present, max_sub_layers_instream, and sub_layer_profile_tier_level_info_present, Table 4B and Table 4D include syntax element codec_code. Syntax element codec_code may be based on the following example definition:

codec_code—This field specifies a 4-character code for codec. For this version of this specification the value of these four characters shall be one of 'hev1', 'hev2', 'hvc1', 'hvc2', 'hv1' or 'lhe1' with semantic meaning for these codes as specified in ISO/IEC 14496-15.

That is, codec_code may identify a track type as described above with respect to Table 3A. In this manner, codec_code may indicate constraints associated with a layer and/or a stream of encoded video data.

As illustrated above, in addition to including example syntax elements descriptor_tag, descriptor_length, temporal_scalability_present, scalability_info_present, multiview_info_present, res_cf_bd_info_present, pr_info_present, br_info_present, color_info_present, max_sub_layers_instream, and sub_layer_profile_tier_level_info_present, Table 4C includes syntax element codec_indicator. Syntax element codec_indicator may be based on the following example definition:

codec_indicator—specifies a value which indicates 4-character code for codec. The defined values for codec_indicator are as follows 0='hev1', 1='hev2', 2='hvc1', 3='hvc2', 4='lhv1' 5='lhe1', 6-255=reserved; with semantic meaning for these codes as specified in ISO/IEC 14496-15.

That is, codec_indicator may identify a track type as described above with respect to Table 3A. In this manner, codec_indicator may indicate constraints associated with a layer and/or a stream of encoded video data.

As illustrated above, in addition to including example syntax elements descriptor_tag, descriptor_length, temporal_scalability_present, scalability_info_present, multiview_info_present, res_cf_bd_info_present, pr_info_present, br_info_present, color_info_present, max_sub_layers_instream, and sub_layer_profile_tier_level_info_present, Table 4B and Table 4C include syntax elements tid_max and tid_min. Syntax elements tid_max and tid_min may be based on the following example definitions:

tid_max—This 3-bit field shall indicate the maximum value of TemporalId (as defined in ITU-T H.265) of all access units for this video asset tid_max shall be in the range of 0 to 6, inclusive. tid_max shall be greater than or equal to tid_min.

In an example variant in a particular version of particular specification of standard the values allowed for tid_max may be restricted. For example, in one case, for a particular version of particular specification tid_max shall be in the range of 0 to 1, inclusive.

tid_min—This 3-bit field shall indicate the minimum value of TemporalId (as defined in Rec. ITU-T H.265) of all access units for this video asset, tid_min shall be in the range of 0 to 6, inclusive.

In an example variant in a particular version of particular specification of standard the values allowed for tid_min may be restricted. For example, in one case, for a particular version of particular specification tid_min shall be equal to 0.

As illustrated above, in addition to including example syntax elements descriptor_tag, descriptor_length, temporal_scalability_present, scalability_info_present, multiview_info_present, res_cf_bd_info_present, pr_info_present, br_info_present, color_info_present, max_sub_layers_instream, and sub_layer_profile_tier_level_info_present, Table 4D includes syntax element tid_present[i]. Syntax elements tid_present[i] may be based on the following example definition:

tid_present[ ]—This 1-bit Boolean flag shall indicate, when set to '1', that the video asset includes TemporalId value (ITU-T H.265) equal to i in at least some access units. When set to '0', indicates that the video asset does not include TemporalId value (ITU-T H.265) equal to i in any access unit.

As illustrated in Tables 4A-4D, based on the value of scalability_info_present, scalability_info( ) may be present. Example semantics for scalability_info( ) are provided in Table 5A.

TABLE 5A

| Syntax | No. of Bits | Format |
| --- | --- | --- |
| scalibility_info( ) { | | |
| asset_layer_id | 6 | uimsbf |
| reserved | 2 | '11' |
| } | | |

Example syntax elements asset_layer_id in Table 5A may be based on the following example definitions:

asset_layer_id specifies the nuh_layer_id for this asset. The value of asset_layer_id may be in the range of 0 to 62, inclusive.

It should be noted that in one example, when scalable_info_present is equal to 1 or multiview_info_present is equal to 1 a Dependency Descriptor specified in section 9.5.3 of MMT specification may be required to be included in MPT for each asset. In this case the num_dependencies element in MMT Dependency Descriptor shall indicate the number of layers that the asset_layer_id for this asset is dependent on.

The asset_id( ) may use following to indicate information about assets that this asset is dependent on:
  asset_id_scheme which identifies the scheme of asset ID as "URI".
  asset_id_value can indicate nuh_layer_id value.

Another example of semantics for scalability_info( ) are provided in Table 5B.

TABLE 5B

| Syntax | No. of Bits | Format |
|---|---|---|
| scalability_info( ) { | | |
|   asset_layer_id | 6 | uimsbf |
|   num_layers_dep_on | 2 | uimsbf |
|   for( i = 0; i < num_layers_dep_on; i++ ) { | | |
|     dep_nuh_layer_id[ i ] | 6 | uimsbf |
|     reserved2 | 2 | '11' |
|   } | | |
| } | | |

Example syntax elements asset_layer_id, num_layers_dep_on, and dep_nuh_layer_id in Table 5B may be based on the following example definitions:
  asset_layer_id specifies the nuh_layer_id for this asset. The value of asset_layer_id shall be in the range of 0 to 62, inclusive.
  num_layers_dep_on specifies the number of layers that the layer corresponding to this asset depends on. num_layers_dep_on shall be in the range of 0 to 2, inclusive. num_dep_on value of 3 is reserved.
  dep_nuh_layer_id[i] specifies the nuh_layer_id for the asset that the current asset depends on. The value of dep_nuh_layer_d[i] shall be in the range of 0 to 62, inclusive.

In this manner scalability_info( ) may be used to signal a layer (e.g., a base layer or an enhancement layer) for an asset of encoded video data and any layer dependencies.

As illustrated in Tables 4A-4D, based on the value of multiview_info_present, multiview_info( ) may be present. Example semantics for multiview_info( ) are provided in Table 6A.

TABLE 6A

| Syntax | No. of Bits | Format |
|---|---|---|
| multiview_info( ) { | | |
|   view_nuh_layer_id | 6 | uimsbf |
|   view_pos | 6 | uimsbf |
|   reserved4 | 4 | '1111' |
|   min_disp_with_offset | 11 | uimsbf |
|   max_disp_range | 11 | uimsbf |
|   reserved2 | 2 | '11' |
| } | | |

Example syntax elements view_nuh_layer_id, view_pos, min_disp_with_offset, and max_disp_range in Table 6A may be based on the following example definitions:
  view_nuh_layer_id specifies the nuh_layer_id for the view represented by this asset. The value of view_nuh_layer_id shall be in the range of 0 to 62, inclusive.
  view_pos specifies the order of the view with nuh_layer_id equal to view_nuh_layer_id among all the views from left to right for the purpose of display, with the order for the left-most view being equal to 0 and the value of the order increasing by 1 for next view from left to right. The value of view_pos may be in the range of 0 to 62, inclusive.
  min_disp_wth_offset minus 1024 specifies the minimum disparity, in units of luma samples, between pictures of any spatially adjacent views among the applicable views in an access unit. The value of min_disp_with_offset may be in the range of 0 to 2047, inclusive. The access unit above may refer to HEVC access unit or to MMT access unit
  max_disp_range specifies that the maximum disparity, in units of luma samples, between pictures of any spatially adjacent views among the applicable views in an access unit. The value of max_disp_range may be in the range of 0 to 2047, inclusive. The access unit above may refer to HEVC access unit or to MMT access unit.

Another example of semantics for multiview_info( ) are provided in Table 6B.

TABLE 6B

| Syntax | No. of Bits | Format |
|---|---|---|
| multiview_info( ) { | | |
|   num_multi_views | 4 | uimsbf |
|   for( i = 0; i < num_multi_views; i++ ) { | | |
|     view_nuh_layer_id[ i ] | 6 | uimsbf |
|     view_pos[ i ] | 6 | uimsbf |
|   } | | |
|   if (num_multi_views%2) == 0 { | | |
|     Reserved | 4 | '1111' |
|   } | | |
|   min_disp_with_offset | 12 | uimsbf |
|   max_disp_range | 12 | uimsbf |
| } | | |

Example syntax elements num_multi_views, view_nuh_layer_id, view_pos, min_disp_with_offset, and max_disp_range in Table 6B may be based on the following example definitions:
  num_multi_views specifies the number of multi-view layers in the stream, num_multi_views may be in the range of 0 to 14, inclusive. num_multi_views value of 15 is reserved.
  view_nuh_layer_id[i] specifies the nuh_layer_id for the view represented by this asset. The value of view_nuh_layer_id[i] may be in the range of 0 to 62, inclusive.
  view_pos[i] specifies the order of the view with nuh_layer_id equal to view_nuh_layer_id[i] among all the views from left to right for the purpose of display, with the order for the left-most view being equal to 0 and the value of the order increasing by 1 for next view from left to right. The value of view_pos[i] may be in the range of 0 to 62, inclusive.
  min_disp_with_offset minus 1024 specifies the minimum disparity, in units of luma samples, between pictures of any spatially adjacent views among the applicable views in an access unit. The value of min_disp_with_offset may be in the range of 0 to 2047, inclusive. The access unit above may refer to HEVC access unit or to MMT access unit.
  max_disp_range specifies that the maximum disparity, in units of luma samples, between pictures of any spatially adjacent views among the applicable views in an access unit. The value of max_disp_range may be in the range of 0 to 2047, inclusive. The access unit above may refer to HEVC access unit or to MMT access unit.

In this manner multiview_info( ) may be used to provide information about multi-view parameters for an asset of encoded video data.

As illustrated in Tables 4A-4D, based on the value of res_cf_bd_info_present, res_cf_bd info( ) may be present. Example semantics for res_cf_bd info 0 are provided in Table 7A.

TABLE 7A

| Syntax | No. of Bits | Format |
| --- | --- | --- |
| res_cf_bd_info( ) { | | |
|   pic_width_in_luma_samples | 16 | uimsbf |
|   pic_height_in_luma_samples | 16 | uimsbf |
|   chroma_format_idc | 2 | uimsbf |
|   if( chroma_format_idc = = 3 ) { | | |
|     separate_colour_plane_flag | 1 | bslbf |
|     reserved5 | 5 | '11111' |
|   } else { | | |
|     reserved6 | 6 | '111111' |
|   } | | |
|   bit_depth_luma_minus8 | 4 | uimsbf |
|   bit_depth_chroma_minus8 | 4 | uimsbf |
| } | | |

Example syntax elements pic_width_in_luma_samples, pic_width_in_chroma_samples, chroma_format_idc, separate_colour_plane_flag, bit_depth_luma_minus8, and bit_depth_chroma_minus8 in Table 7A may respectively have the same semantics meaning as the elements with the same name in H.265 (October 2014) HEVC specification 7.4.3.2 (Sequence parameter set RBSP semantics).

Another example of semantics for res_cf_bd info( ) are provided in Table 7B.

TABLE 7B

| Syntax | No. of Bits | Format |
| --- | --- | --- |
| res_cf_bd_prop_info( ) { | | |
|   pic_width_in_luma_samples | 16 | uimsbf |
|   pic_height_in_luma_samples | 16 | uimsbf |
|   chroma_format_idc | 2 | uimsbf |
|   if( chroma_format_idc = = 3 ) { | | |
|     separate_colour_plane_flag | 1 | bslbf |
|     reserved3 | 3 | '111' |
|   } else { | | |
|     reserved4 | 4 | '1111' |
|   } | | |
|   video_still_present | 1 | bslbf |
|   video_24hr_present | 1 | bslbf |
|   bit_depth_luma_minus8 | 4 | uimsbf |
|   bit_depth_chroma_minus8 | 4 | uimsbf |
| } | | |

Example syntax elements pic_width_in_luma_samples, pic_width_in_chroma_samples, chroma_format_idc, separate_colour_plane_flag, bit_depth_luma_minus8, and bit_depth_chroma_minus8 in Table 5B may respectively have the same semantics meaning as the elements with the same name in H.265 (October 2014) HEVC specification 7.4.3.2 (Sequence parameter set RBSP semantics). Syntax elements video_still_present and video_24 hr_pic_present may be based on the following example definitions:

video_still_present—This 1-bit Boolean flag when set to '1', shall indicate that the video asset may include HEVC still pictures as defined in ISO/IEC 13818-1. When set to '0', the flag shall indicate that the video asset shall not include HEVC still pictures as defined in ISO/IEC 13818-1.

video_24 hr_pic_present—This 1-bit Boolean flag when set to '1', shall indicate that the video asset may include HEVC 24-hour pictures as defined in as defined in ISO/IEC 13818-1. When set to '0', the flag shall indicate that the video asset shall not include any HEVC 24-hour picture as defined in ISO/IEC 13818-1.

In this manner, res_cf_bd_info( ) may be used to signal resolution, a chroma format, and bit depth for an asset of encoded video data. In this manner, resolution, a chroma format, and bit depth may be referred to as picture quality.

As illustrated in Table 4A-4D, based on the value of pr_info_present, pr_info( ) may be present. Example semantics for pr_info( ) are provided in Table 8A.

TABLE 8A

| Syntax | No. of Bits | Format |
| --- | --- | --- |
| pr_info(maxSubLayersMinus1) { | | |
|   for( i = 0; i <= maxSubLayersMinus1; i++) { | | |
|     picture_rate_code[ i ] | 8 | uimsbf |
|     if( picture_rate_code[ i ] = = 255 ) { | | |
|       average_picture_rate[ i ] | 16 | uimsbf |
|     } | | |
|   } | | |
| } | | |

Example syntax elements picture_rate_code and average_picture_rate[i] may be based on the following example definitions:

picture_rate_code[i]: picture_rate_code[i] provides information about the picture rate for the i'th temporal sub-layer of this video asset or stream. The picture_rate_code[i] code indicates following values for picture rate for the i'th temporal sub-layer: 0=unknown, 1=23.976 Hz, 2=24 Hz, 3=29.97 Hz, 4=30 Hz, 5=59.94 Hz, 6=60 Hz, 7=25 Hz, 8=50 Hz, 9=100 Hz, 10=120/1.001 Hz, 11=120 Hz, 12-254=reserved, 255=Other. When picture-rate-code[i] is equal to 255 the actual value of picture rate is indicated by the average_picture_rate[i] element.

average_picture_rate[i] indicates the average picture rate, in units of picture per 256 seconds, of the i-th temporal sub-layer. Semantics of avg_pic_rate[0][i] defined in H.265 (October 2014) HEVC specification section F.7.4.3.1.4 (VPS VUI (Video Usability Information) Semantics) apply. In one example, average . . . picture rate [i] shall not have a value corresponding to either of picture rate values: 23.976 Hz, 24 Hz, 29.97 Hz, 30 Hz, 59.94 Hz, 60 Hz, 25 Hz, 50 Hz, 100 Hz, 120/1.001 Hz, 120 Hz. In this case, the picture_rate_code[i] shall be used to indicate the picture rate.

Another example of semantics for pr_info( ) are provided in Table 8B.

TABLE 8B

| Syntax | No. of Bits | Format |
| --- | --- | --- |
| pr_info(maxSubLayersMinus1) { | | |
|   for( i = 0; i <= maxSubLayersMinus1; i++) { | | |
|     picture_rate_code[ i ] | 8 | uimsbf |
|     if( picture_rate_code[ i ] = = 255) { | | |
|       constant_pic_rate_idc[ i ] | 2 | uimsbf |

TABLE 8B-continued

| Syntax | No. of Bits | Format |
|---|---|---|
|     avg_pic_rate[ i ] | 14 | uimsbf |
|    } | | |
|   } | | |
| } | | |

Example syntax elements picture_rate_code, constant_pic_rate_id, and average_picture_rate[i] may be based on the following example definitions:
- picture_rate_code[i]: picture_rate_code[i] provides information about the picture rate for the i'th temporal sub-layer of this video asset or stream. The picture_rate_code[i] code indicates following values for picture rate for the i'th temporal sub-layer: 0=unknown, 1=23.976 Hz, 2=24 Hz, 3=29.97 Hz, 4=30 Hz, 5=59.94 Hz, 6=60 Hz, 7=25 Hz, 8=50 Hz, 9=100 Hz, 10=120/1.001 Hz, 11=120 Hz, 12-254=reserved, 255=Other. When picture_rate_code[i] is equal to 255 the actual value of picture rate is indicated by the average_picture_rate[i] element.
- constant_pic_rate_idc[i] semantics of constant_pic_rate_idc[0][i] defined in H.265 (October 2014) HEVC specification section F.7.4.3.1.4 (VPS VUI Semantics) apply.
- average_picture_rate[i] indicates the average picture rate, in units of picture per 256 seconds, of the i-th temporal sub-layer. Semantics of avg_pic_rate[0][i] defined in H.265 (October 2014) HEVC specification section F.7.4.3.1.4 (VPS VUI Semantics) apply. average_picture_rate [i] shall not have a value corresponding to either of picture rate values: 23.976 Hz, 24 Hz, 29.97 Hz, 30 Hz, 59.94 Hz, 60 Hz, 25 Hz, 50 Hz, 100 Hz, 120/1.001 Hz, 120 Hz. In this case the picture_rate_code[i] shall be used to indicate the picture rate.

It should be noted that H.265 (October 2014) HEVC specification includes avg_pic_rate[0][i] and also avg_pic_rate[j][i] for signaling the average picture rate and does not provide a mechanism for commonly used picture rates to be signaled easily. Besides the avg_pic_rate[j][i] of H.265 (October 2014) HEVC specification is in units of pictures per 256 seconds, where as a picture rate per second (Hz) is more desirable to be signalled. Thus, the use of picture_rate_code may provide for increased efficiency in signaling a picture rate of an asset of encoded video data.

As illustrated in Table 4A-4D, based on the value of br_info_present br_info (may be present. Example semantics for br_info( ) are provided in Table 9.

TABLE 9

| Syntax | No. of Bits | Format |
|---|---|---|
| br_info(maxSubLayersMinus1) { | | |
|     for( i = 0; i <= maxSubLayersMinus1; i++ ) { | | |
|         average_bitrate[ i ] | 16 | uimsbf |
|         maximum_bitrate[ i ] | 16 | uimsbf |
|     } | | |
| } | | |

Example syntax elements average_bitrate, and maximum_bitrate[i] may be based on the following example definitions:
- average_bitrate[i] indicates the average bit rate of the i-th temporal sub-layer of this video asset or stream in bits per second. The value is calculated using BitRateBPS(x) function as defined in H.265 (October 2014) HEVC specification section F.7.4.3.1.4 (VPS VUI Semantics). Semantics of avg_bit_rate[0][i] defined in H.265 (October 2014) HEVC specification section F.7.4.3.1.4 (VPS VUI Semantics) apply.
- maximum_bitrate[i] indicates maximum bit rate of the i-th temporal sub-layer in any one-second time window. The value is calculated using BitRateBPS(x) function as defined in H.265 (October 2014) HEVC specification section F.7.4.3.1.4 (VPS VUI Semantics). Semantics of max_bitrate[0][i] defined in H.265 (October 2014) HEVC specification section F.7.4.3.1.4 (VPS VUI Semantics) apply.

In this manner, br_info may be used to signal a bit rate for an asset of encoded video data.

As illustrated in Table 4A-4D, based on the value of color_info_present, color_info( ) may be present. Example semantics for color_info( ) are provided in Table 10A.

TABLE 10A

| Syntax | No. of Bits | Format |
|---|---|---|
| color_info( ) { | | |
|     colour_primaries | 8 | uimsbf |
|     transfer_characteristics | 8 | uimsbf |
|     matrix_coeffs | 8 | uimsbf |
| } | | |

In Table 10A, colour_primaries, transfer_characteristics, matrix_coeffs elements may respectively have the same semantics meaning as the elements with the same name in H.265 (October 2014) HEVC specification section E.3.1 (VUI Parameter Semantics). It should be noted that in some examples, each of colour_primaries, transfer_characteristics, matrix_coeffs may be based on more general definitions. For example, colour_primaries may indicate chromaticity coordinates of the source primaries, transfer_characteristics may indicates an opto-electronic transfer characteristic, and/or matrix_coeffs may describe matrix coefficients used in deriving luma and chroma signals from the green, blue, and red primaries. In this manner, color_info( ) may be used to signal color information for an asset of encoded video data.

Another example of semantics for color_info( ) are provided in Table 10B.

TABLE 10B

| Syntax | No. of Bits | Format |
|---|---|---|
| color_info( ) { | | |
|     colour_primaries | 8 | uimsbf |
|     transfer_characteristics | 8 | uimsbf |
|     matrix_coeffs | 8 | uimsbf |
|     if(colour_primaries==9) { | | |
|         cg_compatibility | 1 | bslbf |
|         reserved7 | 7 | '1111111' |
|     } | | |
| } | | |

In Table 10B, syntax elements may be based on the following example definitions:
- colour_primaries, transfer_characteristics, and matrix_coeffs elements respectively may have the same semantics meaning as the elements with the same name in H.265 (October 2014) HEVC specification section E.3.1 (VUI Parameter Semantics).

cg_compatbility—This 1-bit Boolean flag may indicate, when set to '1', that the video asset is coded to be compatible with Rec. ITU-R BT.709-5 color gamut. When set to '0', the flag may indicate that the video asset is not coded to be compatible with Rec. ITU-R BT.709-5 color gamut.

In Table 10B the syntax element cg_compatibility signaled at transport layer allows a receiver or renderer to determine if a wide color gamut (e.g. Rec. ITU-R BT.2020) coded video asset is compatible with standard color gamut such as Rec. ITU R BT.709-5 color gamut. Such indication may be useful in allowing a receiver to select for reception appropriate video assets based on the color gamut that the receiver supports. The compatibility with standard color gamut may mean that when a wide color gamut coded video is converted to standard color gamut no clipping occurs or that colors stay within standard color gamut.

Rec. ITU R BT.709-5 is defined in "Rec. ITU-R BT.709-5, Parameter values for the HDTV standards for production and international programme exchange," which is incorporated by reference in its entirety. Rec. ITU-R BT.2020 is defined in "Rec. ITU-R BT.2020, Parameter values for ultra-high definition television systems for production and international programme exchange," which is incorporated by reference in its entirety.

In Table 10B the element cg_compatibility is conditionally signaled only when the color gamut indicated by colour_primaries element has a value, which corresponds to colour primaries being Rec ITU-R BT.2020. In other examples the element cg_compatibility may be signaled as shown in Table 10C.

TABLE 10C

| Syntax | No. of Bits | Format |
|---|---|---|
| color_info( ) { | | |
| colour_primaries | 8 | uimsbf |
| transfer_characteristics | 8 | uimsbf |
| matrix_coeffs | 8 | uimsbf |
| cg_compatibility | 1 | bslbf |
| reserved7 | 7 | '1111111' |
| } | | |

In Table 10B and 8C after the syntax element cg_compatibility an element reserved7 which is 7-bit long sequence with each bit set to '1' may be included. This may allow the overall color_info( ) to be byte aligned which may provide for easy parsing. In another example instead the reserved7 may be a sequence where each bit is '0'. In yet another example the reserved7 syntax element may be omitted and byte alignment may not be provided. Omitting reserved7 syntax element may be useful in the case where bit savings is important.

In other examples the semantics of the syntax element cg_compatibility may be defined as follows:
cg_compatibility—This 1-bit Boolean flag may indicate, when set to '1', that the wide color gamut video asset is coded to be compatible with standard color gamut. When set to '0', the flag may indicate that the wide color gamut video asset is not coded to be compatible with standard color gamut.

In another example definition of cg_compatibility, the term extended color gamut may be used instead of the term wide color gamut. In another example, the semantics for '0' value for cg_compatbility element may indicate that it is unknown whether the video asset is coded to be compatible with standard color gamut.

In another example instead of using 1-bit for cg_compatibility, 2-bits may be used. Two examples of this syntax are shown in Table 10D and Table 10E, respectively. As illustrated, the difference between these two tables is that in Table 10D the syntax element cg_compatibility is signalled conditionally based on the value of syntax element colour_primaries, where as in Table 10E the syntax element cg_compatibility is always signalled.

TABLE 10D

| Syntax | No. of Bits | Format |
|---|---|---|
| color_info( ) { | | |
| colour_primaries | 8 | uimsbf |
| transfer_characteristics | 8 | uimsbf |
| matrix_coeffs | 8 | uimsbf |
| if(colour_primaries==9) { | | |
| cg_compatibility | 2 | uimsbf |
| reserved6 | 7 | '111111' |
| } | | |
| } | | |

TABLE 10E

| Syntax | No. of Bits | Format |
|---|---|---|
| color_info( ) { | | |
| colour_primaries | 8 | uimsbf |
| transfer_characteristics | 8 | uimsbf |
| matrix_coeffs | 8 | uimsbf |
| cg_compatibility | 2 | uimsbf |
| reserved7 | 6 | '111111' |
| } | | |

With respect to Table 10D and Table 10E the semantics of cg_compatibility may be based on the following example definition:
cg_compatibility—This 2-bit field may indicate, when set to '01', that the video asset is coded to be compatible with Rec. ITU-R BT.709-5 color gamut. When set to '00', the field may indicate that the video asset is not coded to be compatible with Rec. ITU-R BT.709-5 color gamut. When set to '10', the field may indicate that it is unknown whether the video asset is coded to be compatible with Rec. ITU-R BT.709-5 color gamut. Value of '11' for this field is kept reserved.

In another example the semantics of cg_compatibility may be based on the following example definition:
cg_compatibility—This 2-bit field may indicate, when set to '01', that the video asset is coded to be compatible with standard color gamut. When set to '00', the field may indicate that the video asset is not coded to be compatible with standard color gamut. When set to '10', the field may indicate that it is unknown whether the video asset is coded to be compatible with standard color gamut. Value of '11' for this field may be kept reserved.

When 2 bits are used to code the field cg_compatbility the next syntax element may change from 'reserved7' to 'reserved6' which is a 6-bit long sequence with each bit set to '1.' This may allow the overall color_info( ) to be byte aligned which provides easy parsing. In another example instead the reserved6 there may be a sequence where each bit is '0'. In yet another example, the reserved6 syntax element may be omitted and byte alignment not provided. This may be the case if bit savings is important. With respect to Table 10B and Table 10D in one example, the cg_compatibility information may only be signalled for certain values of colour primaries. For example if colour_primaries is greater than or equal to 9 i.e. (colour_primaries>=9) instead of (colour_primaries==9).

Another example of syntax for color_info( ) is provided in Table 10F. In this case support is provided to allow inclusion of Electro-Optical Transfer Function (EOTF) information.

TABLE 10F

| Syntax | No. of Bits | Format |
|---|---|---|
| color_info( ) { | | |
|     colour_primaries | 8 | uimsbf |
|     transfer_characteristics | 8 | uimsbf |
|     matrix_coeffs | 8 | uimsbf |
|     if(colour_primaries>=9) { | | |
|         cg_compatibility | 1 | bslbf |
|         reserved7 | 7 | '1111111' |
|     } | | |
|     if(transfer_characteristics>=16) { | | |
|         eotf_info_present | 1 | bslbf |
|         if(eotf_info_present) { | | |
|             eotf_info( ) | var | TBD |
|         } | | |
|     } | | |
| } | | |

In Table 10F, the semantics of eotf_info_present may be based on the following example definition:

eotf_info_present—This 1-bit Boolean flag shall indicate, when set to '1', that the elements in eotf_info( ) structure are present. When set to '0', the flag shall indicate that the elements in eotf_info( ) structure are not present, where eotf_info( ) provides Electro-Optical Transfer Function (EOTF) information data to be defined further.

In another example, the EOTF information may only be signalled for certain values of transfer characteristics. For example if transfer_characteristics is equal to 16 i.e. (transfer_characteristics==16) or if transfer_characteristics is equal to 16 or 17 i.e. ((transfer_characteristics==16) || transfer_characteristics==17)).

In one example, in Table 10F semantics of cg_compatibility may be based on the following example definition:

cg_compatibility—This 1-bit Boolean flag shall indicate, when set to '1', that the video asset is coded to be compatible with Rec. ITU R BT.709-5 color gamut. When set to '0', the flag shall indicate that the video asset is not coded to be compatible with Rec. ITU R BT.709-5 color gamut.

As illustrated in Tables 4A-4D, profile_tier_level( ) may be present based on the values of scalable_info_present and multiview_info_present. In one example, profile_tier_level( ) may include a profile, tier, level syntax structure as described in H.265 (October 2014) HEVC specification section 7.3.3.

It should be noted the video_streamproperties_descriptor may be signaled in one or more of the following locations: a MMT Package (MP) Table, a ATSC service signaling in mmt_atsc3_message( ), and a ATSC service signaling in User Service Bundle Description (USBD)/User Service Description. Current proposals for the ATSC 3.0 suite of standards define a MMT signaling message (e.g., mmt_atsc3_message( )), where a MMT signaling message is defined to deliver information specific to ATSC 3.0 services. A MMT signaling message may be identified using a MMT message identifier value reserved for private use (e.g., a value of 0x8000 to 0xFFFF). Table 11 provides example syntax for a MMT signaling message mmt_atsc3_message( ).

As described above, in some instances, it may be beneficial for a receiving device to be able to access video parameters prior to decapsulating NAL units or ITU-T H.265 messages. Further, it may be beneficial for a receiving device to parse a mmt_atscs3_message( ) including a video_stream_properties_descriptor( ) before parsing an MPU corresponding to the video asset associated with video_stream_properties_descriptor( ). In this manner, in one example, service distribution engine 500 may be configured to pass MMTP packets including a mmt_atscs3_message( ) including a video_stream_properties_descriptor( ) to the UDP layer before passing MMTP packets including video assets to the UDP layer for a particular time period. For example, service distribution engine 500 may be configured to pass MMTP packets including a mmt_atscs3_message( ) including a video_stream_properties_descriptor( ) to the UDP layer at the start of a defined interval and subsequently pass MMTP packets including video assets to the UDP layer. It should be noted that an MMTP packet may include a timestamp field that represents the Coordinated Universal Time (UTC) time when the first byte of an MMTP packet is passed to the UDP layer. Thus, for a particular time period, a timestamp of MMTP packets including a mmt_atscs3_message( ) including a video_stream_properties_descriptor( ) may be required to be less than a timestamp of MMTP packets including video assets corresponding to the video_stream_properties_descriptor( ). Further, service distribution engine 500 may be configured such that an order indicated by timestamp values is maintained up to the transmission of RF signals. That is, for example, each of transport/network packet generator 504, link layer packet generator 506, and/or frame builder and waveform generator 508 may be configured such that a MMTP packet including a mmt_atscs3_message( ) including a video_stream_properties_descriptor( ) is transmitted before MMTP packets including any corresponding video assets. In one example, it may be a requirement that a mmt_atsc3_message( ) carrying video_stream_properties_descriptor( ) shall be signaled for a video asset before delivering any MPU corresponding to the video asset.

Further, in some examples, in the case where a receiver device receives MMTP packets including video assets before receiving an MMTP packet including a mmt_atscs3_message( ) including a video_stream_properties_descriptor( ), the receiver device may delay parsing of the MMTP packets including corresponding video assets. For example, a receiver device may cause MMTP packets including video assets to be stored in one or more buffers. It should be noted that in some examples, one or more additional video_stream_properties_descriptor( ) messages for a video asset may be delivered after delivery of a first video_stream_properties_descriptor( ). For example, video_stream_properties_descriptor( ) messages may be transmitted according to a specified interval (e.g, every 5 seconds). In some examples, each of the one or more additional video_stream_properties_descriptor( ) messages may be delivered after delivery of one or more MPUs following the first video_stream_properties_descriptor( ). In another example, for each video asset, a video_stream_properties_descriptor( ) may be required to be signaled which associates the video asset with a video_stream_properties_descriptor( ). Further, in one example, parsing of MMTP packets including video assets may be contingent on receiving a corresponding video_stream_properties_descriptor( ).

That is, upon a channel change event, a receiver device may wait until the start of an interval as defined by a MMTP packet including a mmt_atscs3_message( ) including a video_stream_properties_descriptor( ) before accessing a corresponding video asset.

TABLE 11

| Syntax | No. of Bits | Format |
|---|---|---|
| mmt_atsc3_message( ) { | | |
|     message_id | 16 | uimsbf |
|     Version | 8 | uimsbf |
|     length | 32 | uimsbf |
|     message payload { | | |
|         service_id | 16 | uimsbf |
|         atsc3_message_content_type | 8 | uimbsf |
|         atsc3_message_content_version | 8 | uimbsf |
|         atsc3_message_content_compression | 8 | uimbsf |
|         URI_length | 8 | uimbsf |
|         for (i=0;i< URI_length;i++) { | | |
|             URI_byte | 8 | uimsbf |
|         } | | |
|         atsc3_message_content_length | 32 | uimsbf |
|         for (i=0;i<atsc3_message_content_length;i++) { | | |
|             atsc3_message_content_byte | 8 | uimsbf |
|         } | | |
|         for | | |
| (i=0;i<length-10-URI_length-atsc3_message_content_length) { | | |
|         Reserved | 8 | uimsbf |
|         } | | |
|     } | | |
| } | | |

Current proposals for the ATSC 3.0 suite of standards provide the following definitions for syntax elements message_id, version, length, service_id, atsc3_message_content_type, atsc3_message_content_version, atsc3-message-content_compression, URI_length, URI_byte, atsc3_message_content_length, atsc3_message_content_byte, and reserved:

message_id—A 16-bit unsigned integer field that shall uniquely identify the mmt_atsc3_message( ). The value of this field shall be 0x8000.

version—An 8-bit unsigned integer field that shall be incremented by 1 any time there is a change in the information carried in this message. When the version field reaches its maximum value of 255, its value shall wraparound to 0.

length—A 32-bit unsigned integer field that shall provide the length of mmt_atsc3_message( ) in bytes, counting from the beginning of the next field to the last byte of the mmt_atsc3_message( ).

service_id—A 16-bit unsigned integer field that shall associate the message payload with the service identified in the serviceId attribute given in the Service Labeling Table (SLT).

atsc3_message_content_type—A 16-bit unsigned integer field that shall uniquely identify the type of message content in the mmt_atsc3_message( ) payload.

atsc3_message_content_version—An 8-bit unsigned integer field that shall be incremented by 1 any time there is a change in the atsc3_message content identified by a service_id and atsc_message_content_type pair. When the atsc3_message_content_version field reaches its maximum value, its value shall wraparound to 0.

atsc3_mesage_content_compression—An 8-bit unsigned integer field that shall identify the type of compression applied to the data in atsc3_message_content_byte.

URI_length—An 8-bit unsigned integer field that shall provide the length of the Universal Resource Identifier (URI) uniquely identifying the message payload across services. If the URI is not present, the value of this field shall be set to 0.

URI_byte—An 8-bit unsigned integer field that shall contain a UTF-8 [where UTF is an acronym of unicode transformation format] character of the URI associated with the content carried by this message excluding the terminating null character, as per Internet Engineering Task Force (IETF) Request for Comments (RFC) 3986. This field when present shall be used to identify delivered message payloads. The URI can be used by system tables to reference tables made available by delivered message payloads.

atsc3_message_content_length—A 32-bit unsigned integer field that shall provide the length of the content carried by this message.

atsc3_message_content_byte—An 8-bit unsigned integer field that shall contain a byte of the content carried by this message.

In this manner, transport package generator 600 may be configured to signal various video stream characteristics using flags to indicate whether information regarding various video stream characteristics are present. This signaling may be particular useful for multimedia presentation including multiple video elements, including, for example, multimedia presentations which include multiple camera view presentations, three dimensional presentations through multiple views, temporal scalable video presentations, spatial and quality scalable video presentations.

It should be noted that MMTP specifies that signaling messages may be encoded in one of different formats, such as XML format. Thus, in one example XML, JSON, or other formats may be used for all or part of the video stream properties descriptor. Table 12 shows an exemplary video stream properties description XML format.

TABLE 12

| Element or Attribute Name | Use | Description |
| --- | --- | --- |
| VidStreamPropos | | Root element of the Video Stream Properties Description |
|   codecCode | 1 | This field specifies 4-character code for codec. For this version of this specification the value of these four characters shall be one of 'hev1', 'hev2', 'hvc1', 'hvc2', 'lhv1' or 'lhe1' with semantic meaning for these codes as specified in ISO/IEC 14496-15. |
|   @bsid | 1 | Identifier of the whole Broadcast Stream. The value of BSID (Broadcast Stream Identifier) shall be unique on a regional level (for example, North America). An administrative or regulatory authority may play a role. |
|   TemporalScalability | 1 | This 1-bit Boolean flag shall indicate, when set to '1', that the present and temporal scalability is provided in the asset or stream. When set to '0', the flag shall indicate that the temporal scalability is not provided in the asset or stream. |
|     @max_sub_layers_in_stream | 1 | This unsigned integer shall specify the maximum number of temporal sub-layers that may be/are present in each Coded Video Sequence (CVS) in the asset or video stream. The value of @max_sub_layers_in_stream shall be in the range of 1 to 7, inclusive. |
|     @sub_layer_profile_tier_level_info_present | 0 . . . 1 | This 1-bit Boolean flag shall indicate, when set to '1', that the profile, tier, level information may be/ is present for temporal sub-layers in the asset or video stream. When set to '0', the flag shall indicate that the profile, tier, level information is not present for temporal sub-layers in the asset or video stream. When not present @sub_layer_profile_tier_level_info_present is inferred to be equal to 0. |
|     @tid_max | 1 | This field shall indicate the maximum value of TemporalId (as defined in ITU-T H.265) of all access units for this video asset. tid_max shall be in the range of 0 to 6, inclusive |
|     @tid_min | 1 | This field shall indicate the minimum value of TemporalId (as defined in ITU-T H.265) of all access units for this video asset. tid_min shall be in the range of 0 to 6, inclusive |
|     @tid_present_mask | 1 | The i'th least significant bit of this unsigned byte field shall indicate, when set to '1', that the video asset includes TemporalId value (as defined in ITU-T H.265) equal to i in at least some access units. The i'th least significant bit of this unsigned byte field when set to '0', indicates that the video asset does not include TemporalId value (as defined in ITU-T H.265) equal to i in any access unit. The value of most significant bit of this field is ignored. |
|   ScalabilityInfo | 0 . . . 1 | Provides scalability information about the asset or stream. |
|     @asset_layer_id | 1 | Specifies the nuh_layer_id for this asset or stream. The value of asset_layer_id shall be in the range of 0 to 62, inclusive. |
|   MultiviewInfo | 0 . . . 1 | Provides multi-view information about the asset or stream. |
|     @view_nuh_layer_id | 1 | specifies the nuh_layer_id for the view represented by this asset. @view_nuh_layer_id shall be in the range of 0 to 62, inclusive. |
|     @view_pos | 1 | specifies the order of the view with nuh_layer_id equal to @view_nuh_layer_id among all the views from left to right for the purpose of display, with the order for the left-most view being equal to 0 and the value of the order increasing by 1 for next view from left to right. The value of @view_pos shall be in the range of 0 to 62, inclusive. |
|     @min_disp_with_offset | 0 . . . 1 | @min_disp_with_offset minus 1024 specifies the minimum disparity, in units of luma samples, between pictures of any spatially adjacent views among the applicable views in an access unit. The value of min_disp_with_offset shall be in the range of 0 to 2047, inclusive. The access unit above may refer to HEVC access unit or to MMT access unit. |
|     @max_disp_range | 0 . . . 1 | @max_disp_range specifies that the maximum disparity, in units of luma samples, between pictures of any spatially adjacent views among the applicable views in an access unit. The value of max_disp_range shall be in the range of 0 to 2047, |

TABLE 12-continued

| Element or Attribute Name | Use | Description |
|---|---|---|
| | | inclusive. The access unit above may refer to HEVC access unit or to MMT access unit. |
| ResCFBDInfo | 0 . . . 1 | Provides resolution, chroma format, bit-depth information about the asset or stream. |
| @pic_width_in_luma_samples | 1 | has the same semantics meaning as the pic_width_in_luma_samples syntax element in HEVC specification section 7.4.3.2 (Sequence parameter set RBSP semantics). |
| @pic_width_in_chroma_samples | 1 | has the same semantics meaning as the pic_height_in_luma_samples syntax element in HEVC specification section 7.4.3.2 (Sequence parameter set RBSP semantics). |
| @chroma_format_idc | 1 | has the same semantics meaning as the chroma_format_idc syntax element in HEVC specification section 7.4.3.2 (Sequence parameter set RBSP semantics). |
| @separate_colour_plane_flag | 0 . . . 1 | has the same semantics meaning as the separate_colour_plane_flag syntax element in HEVC specification section 7.4.3.2 (Sequence parameter set RBSP semantics). @separate_colour_plane_flag shall only be present when @chroma_format_idc has a value equal to 3. |
| @bit_depth_luma_minus8 | 1 | has the same semantics meaning as the bit_depth_luma_minus8 syntax element in HEVC specification section 7.4.3.2 (Sequence parameter set RBSP semantics). |
| @bit_depth_chroma_minus8 | 1 | has the same semantics meaning as the bit_depth_chroma_minus8 syntax element in HEVC specification section 7.4.3.2 (Sequence parameter set RBSP semantics). |
| PRInfo | 0 or 1 or MaxSL | Provides picture rate information about the asset or stream. There shall be Exactly 0 or 1 of MaxSL occurrences of PRInfo element. |
| @TemporalSubLayer | 1 | Temporal sub-layer for which the picture rate information is provided |
| <choice> | 1 | Only one of the picture_rate_code or average_picture_rate elements shall be present inside a PRInfo element |
| picture_rate_code | 0 . . . 1 | picture_rate_code provides information about the picture rate for the temporal sub-layer @TemporalSubLayer. The picture_rate_code indicates following values for picture rate for the temporal sub-layer @TemporalSubLayer: 0 = unknown, 1 = 23.976 Hz, 2 = 24 Hz, 3 = 29.97 Hz, 4 = 30 Hz, 5 = 59.94 Hz, 6 = 60 Hz, 7 = 25 Hz. 8 = 50 Hz, 9 = 100 Hz, 10 = 120/1.001 Hz, 11 = 120 Hz, 12-255 = reserved. |
| average_picture_rate | 0 . . . 1 | average_picture_rate indicates the average picture rate, in units of picture per 256 seconds, of the temporal sub-layer @TemporalSubLayer. Semantics of avg_pic_rate[0][i] defined in HEVC section F.7.4.3.1.4 (VPS VUI Semantics) apply. average_picture_rate shall not have a value corresponding to either of picture rate values: 23.976 Hz, 24 Hz, 29.97 Hz, 30 Hz, 59.94 Hz, 60 Hz, 25 Hz, 50 Hz, 100 Hz, 120/1.001 Hz, 120 Hz. In this case the picture_rate_code element shall be used to indicate the picture rate. |
| BRInfo | 0 or 1 or MaxSL | Provides bit rate information about the asset or stream. There shall be Exactly 0 or 1 of MaxSL occurrences of BRInfo element. |
| @TemporalSubLayer | 1 | Temporal sub-layer for which the bit rate information is provided |
| @average_bit_rate | 1 | @average_bit_rate indicates the average bit rate of the temporal sub-layer @Temporal SubLayer in bits per second. The value is calculated using BitRateBPS(x) function as defined in HEVC section F.7.4.3.1.4 (VPS VUI Semantics). Semantics of avg_bit_rate[0][i] defined in HEVC section F.7.4.3.1.4 (VPS VUI Semantics) apply. |
| @maximum_bit_rate | 1 | @maximum_bit_rate indicates maximum bit rate of the of the temporal sub-layer @TemporalSubLayer in any one-second time window. The value is calculated using BitRateBPS(x) function as |

TABLE 12-continued

| Element or Attribute Name | Use | Description |
|---|---|---|
| | | defined in HEVC Scalable section F.7.4.3.1.4 (VPS VUI Semantics). Semantics of max_bit_rate[0][i] defined in HEVC section F.7.4.3.1.4 (VPS VUI Semantics) apply. |
| Colorinfo | 0 . . . 1 | Provides color information about the asset or the stream. |
| @colour_primaries | 1 | Has the same semantics meaning as the syntax element colour_primaries in HEVC specification section E.3.1 (VUI Parameter Semantics). |
| @transfer_characteristics | 1 | Has the same semantics meaning as the syntax element transfer_characteristics in HEVC specification section E.3.1 (VUI Parameter Semantics). |
| @matrix_coeffs | 1 | Has the same semantics meaning as the syntax element matrix_coeffs in section E.3.1 (VUI Parameter Semantics). |
| @cg_compatibility | 1 | This 1-bit Boolean flag shall indicate, when set to '1', that the wide color gamut video asset is coded to be compatible with standard color gamut. When set to '0', the flag shall indicate that the wide color gamut video asset is not coded to be compatible with standard color gamut. |
| eotf_info | 0 . . . 1 | Provides Electro-Optical Transfer Function (EOTF) information data. |

It should be noted that more, fewer, or different element may be included in Table 12. For example, the variations described above with respect to Table 4A-10F above may be applicable to Table 12.

As described above, an mmt_atsc3_message( ) with a Caption_service_information message payload may be used to signal caption service information. A Caption_service_information message may be indicated by use of a predetermined value for message_id syntax element in mmt_atsc3_message( ). Table 13 provides proposed syntax of a Caption_service_information message.

TABLE 13

| Syntax | No. of Bits | Format |
|---|---|---|
| Caption_service_information { | | |
|   number_of_services | 8 | uimsbf |
|   for (i=0; i<number_of_services; i++) { | | |
|     asset_id_length | 8 | uimsbf |
|     for (j=0; j<asset_id_length; j++) { | | |
|       asset_id_byte | 8 | uimsbf |
|     } | | |
|     language | 8*3 | uimsbf |
|     role | 4 | bslbf |
|     aspect_ratio | 4 | bslbf |
|     easy_reader | 1 | bslbf |
|     profile | 1 | bslbf |
|     3d_support | 1 | bslbf |
|     reserved | 5 | bslbf |
|   } | | |
| } | | |

It should be noted that in Table 13, and other tables included in this description, bslbf refers to a bit string, left bit first data type. Current proposals for the ATSC 3.0 suite of standards provide the following definitions for syntax elements number_of_services, asset_id_length, asset_id_byte, language, role, aspect_ratio, easy_reader, profile, and 3d_support. Syntax element reserved may be reserved for future use.

number_of_services—An 8-bit unsigned integer field that shall specify the number of caption services.

asset_id_length—An 8-bit unsigned integer field that shall specify the length in bytes of the URI identifying the caption asset id.

asset_id_byte—An 8-bit unsigned integer field that shall contain a byte of the caption asset id URI.

language—A 24-bit unsigned integer field that shall represent the language of the caption service and that shall be encoded as a 3-character language code as per ISO 639.2/B. Each character shall be encoded into 8 bits according to ISO 8859-1 (ISO Latin-1) and inserted in order into this field.

role—A 4-bit field that shall specify the purpose of the closed caption text as given in Table 14 below.

TABLE 14

| Role | Meaning |
|---|---|
| 0x0 | main |
| 0x1 | alternate |
| 0x2 | commentary |
| 0x3~0xF | Reserved for future use | aspect_ratio—A 4-bit field that shall specify the display aspect ratio assumed by the caption author and as given in Table 15 below.

TABLE 15

| aspect_ratio | Meaning |
|---|---|
| 0x0 | 16:9 |
| 0x1 | 4:3 |
| 0x2 | 21:9 |
| 0x3~0xF | Reserved for future use | profile—A 1-bit field that when set to '1' shall indicate the use of an image captions profile (e.g., use of a W3C: "TTML Text and Image Profiles for Internet Media Subtitles and Captions (IMSC1)", [Candidate] Recommendation, W3C, image captions profile), and when set to '0' shall indicate text captions (e.g., use of a IMSC1 text profile).

easy_reader—A 1-bit field that when set to '1' shall indicate an easy reader closed caption service, and otherwise not.

3d support—A 1-bit field that when set to '1' shall indicate support for both 2d and 3d support, and otherwise support for 2d video only.

In the definition of language above ISO 639.2/B is described in ISO 639-2:1998, Codes for the representation of names of languages—Part 2: Alpha-3 code and ISO 8859-1 (ISO Latin-1) is described in ISO/IEC 8859-1:1998, Information technology—8-bit single-byte coded graphic character sets—Part 1: Latin alphabet No. 1, each of which is incorporated by reference in its entirety. Represent the language of a caption service using ISO 639.2/B and ISO 8859-1 may be less than ideal. In particular ISO 639.2/B and ISO 8859-1 may limit that number of languages that be signalled. This may be particularly problematic for future types of captioning services, e.g., captioning services associated with a role value of 0x3~0xF or caption services which would like to add languages in the future.

Timed Text Markup Language (TTML) Text and Image Profiles for Internet Media Subtitles and Captions 1.0 (TrML1, W3C Candidate Recommendation 19 May 2015), which is incorporated by reference in its entirety, uses a xml:lang attribute, a language tag syntax, to represent a language of a caption service. The values of xml:lang attribute in TTML1 are language identifiers as defined by Internet Engineering Task Force (IETF) Best Current Practice (BCP) 47. It should be noted that BCP is a persistent name for a series of IETF RFCs whose numbers change as they are updated. The latest RFC describing language tag syntax is RFC 5646, Tags for the Identification of Languages, which is incorporated by reference herein, and it obsoletes the older RFCs 4646, 3066 and 1766. In RFC 5646, the length of value of xml:lang is variable. As such, IETF BCP 47 may be used to represent a language of a caption service in a more efficient manner than ISO 639.2/B and ISO 8859-1.

Table 16A provides an example of a syntax of a Caption_service_information message that includes IETF BCP 47 to represent a language of a caption service. It should be noted that in the example of Table 16A syntax elements number_of services, asset_id_length, asset_id_byte, and role, aspect_ratio, easy_reader, profile, 3d_support, and reserved may be based on the definitions provided above with respect to Table 13, and variations thereof, and for the sake of brevity the definitions are not repeated below.

TABLE 16A

| Syntax | No. of Bits | Format |
|---|---|---|
| Caption_service_information { | | |
|   number_of_services | 8 | uimsbf |
|   for (i=0; i<number_of_services; i++) { | | |
|     asset_id_length | 8 | uimsbf |
|     for (j=0; j<asset_id_length; j++) { | | |
|       asset_id_byte | 8 | uimsbf |
|     } | | |
|     language_length | 8 | uimsbf |
|     for (j=0; j< language_length; j++) { | | |
|       language_byte | 8 | uimsbf |
|     } | | |
|     role | 4 | bslbf |
|     aspect_ratio | 4 | bslbf |
|     easy_reader | 1 | bslbf |
|     profile | 1 | bslbf |
|     3d_support | 1 | bslbf |
|     reserved | 5 | bslbf |
|   } | | |
| } | | |

In Table 16A, syntax elements language_length and language_byte may be based on the following example definitions:

language_length—An 8-bit unsigned integer field that shall specify the length in bytes of the language of the caption service.

language_byte—An 8-bit unsigned integer field that shall contain a UTF-8 character of the language of the caption service. The language of the caption of service are language identifiers as defined by IETF BCP 47.

Where a UTF-8 character may be defined based on the following definition:

UTF-8 is a character encoding capable of encoding all possible characters, or code points, in Unicode. The encoding is variable-length and uses 8-bit code units. The name is derived from: Universal Coded Character Set+Transformation Format–8-bit It should be noted that although the example definition of language_byte above is based on a UTF-8 character, in other examples, encodings other than UTF-8 may be used (e.g., ISO 8859-1 or any suitable encoding for alphabets, numbers, symbols, and special characters). In an example, a Caption_service_information message may make use of IETF BCP 47, published in September 2009 to represent a language of a caption service. Use of IETF BCP 47 enables receiving devices that may be updated every time IETF BCP 47 is updated. In one example, a Caption_service_information message may make use of an RFC e.g. RFC 5646 to represent a language of a caption service. In one example, the signaling of language_length may be skipped and inferred to a value corresponding to the largest possible string that can be used for language. In one example, the signaling of language_length may be skipped and the language string is terminated by use of a special signal (e.g. a terminating character).

Syntax element language_byte may enable a greater number of languages to be signaled than a fixed length three byte syntax element, including languages than may be defined in the future (e.g., languages including local dialects). Further, the use of IETF BCP 47 affords greater compatibility of a broadcast signal with the Internet. It should be noted that in one example each language_byte within the example for loop provided in Table 16A may be a sequential encoding of the language identifier. In one example, the sequence may be ordered from left-to-right.

It should be noted that although, in some examples, each caption service may be represented by an MPU sub-flow, a mmt_atsc3_message( ) with a Caption_service_information message payload may be associated with one or more caption services. In one example, each caption service may correspond to a MMTP packet sub-flow, a mmt_atsc3_message( ) with a Caption_service_information message payload may be associated with one or more caption services. The MMTP packet sub-flow is the subset of the packets of an MMTP packet flow that share the same packet_id. The object flow is transported as an MMTP packet sub-flow. In one example, each caption service may correspond to a set of MMTP packet sub-flows, a mmt_atsc3_message( ) with a Caption_service_information message payload may be associated with one or more caption services. The set of MMTP packet sub-flow may be determined based on asset id.

In one example, Caption_service_information may be carried in a MMT Package Table (MP Table—as defined in Table 20 of MMT). A complete MP table generally has the information related to a Package including the list of all Assets. A subset MP table has a portion of information from a complete MP table. In one example, the Caption_service_information may include a field indicating the caption format carried in the corresponding asset. Examples of caption formats include IMSC1, and CEA-608 and CEA-708 formats developed by the Electronic Industries Alliance, etc. In one example the Caption_service_information may use different signaling mechanism for different caption formats e.g. IMSC1 would use IETF BCP 47 while CEA-708 and CEA-608 would use ISO 639.2/B and ISO 8859-1. In one example the Caption_service_information may indicate if the fonts used in the service are downloadable fonts. In one example, if the fonts are downloadable, the URL and the font family name may be signaled. In this manner, transport package generator 600 represents an example of a device configured to signal a syntax element indicating the number of a concatenated syntax elements identifying a caption service, and signal one or more concatenated syntax elements identifying a caption service.

As described above, an mmt_atsc3_message( ) having a atsc3_message_content_type of Caption Asset Descriptor may be used to signal caption asset information. Table 16B provides an example of syntax for a caption_asset_descriptor message.

TABLE 16B

| Syntax | No. of Bits | Format |
|---|---|---|
| caption_asset_descriptor( ){ | | |
|     descriptor_tag | 16 | uimsbf |
|     descriptor_length | 16 | uimsbf |
|     number_of_assets | 8 | uimsbf |
|     for (i=0; i<number_of_assets; i++) { | | |
|         asset_id_length | 8 | uimsbf |
|         for (j=0; j<asset_id_length; j++) { | | |
|             asset_id_byte | 8 | uimsbf |
|         } | | |
|         language_length | 8 | uimsbf |
|         for (j=0; j< language_length; j++) { | | |
|             language_byte | 8 | uimsbf |
|         } | | |
|         role | 4 | bslbf |
|         aspect_ratio | 4 | bslbf |
|         easy_reader | 1 | bslbf |
|         profile | 2 | bslbf |
|         3d_support | 1 | bslbf |
|         reserved | 4 | bslbf |
|     } | | |
| } | | |

It should be noted that in the example of Table 16B syntax elements asset_id_length, asset_id_byte, language_length, language_byte, role, aspect_ratio, easy_reader, 3d_support, and reserved may be based on the definitions provided above with respect to Table 16A, and variations thereof, and for the sake of brevity the definitions are not repeated below. In the example illustrated in Table 16B syntax elements descriptor_tag, descriptor_length, number_of_assets, and profile may be based on the following example definitions:

descriptor_tag—This 16-bit unsigned integer shall have a value identifying this descriptor as being the caption_asset_descriptor( ). It should be noted that the particular value will be based on tag assignment mechanisms that avoid collisions in the various ATSC 3.0 suite of standards.

descriptor_length—This 16-bit unsigned integer shall specify the length (in bytes) immediately following this field up to the end of this descriptor.

number_of_assets—An 8-bit unsigned integer field that shall specify the number of caption assets.

profile—A 2-bit field that when set to '01' shall indicate image captions, and when set to '00' shall indicate text captions. Field values '10' and '11' shall be reserved for future use.

It should be noted that in the example of Table 16B, a 16-bit descriptor_length field enables 65,536 values to be signalled. In one example, values of the 16-bit descriptor_length field may be sequentially mapped to integers within the range of 0 to 65,535. It should be noted that in other examples, values of the 16-bit descriptor_length field may be sequentially mapped to integers within a range having a minimum number based on a minimum number of bytes that may be signaled for a minimum number of caption assets that are included in the descriptor. For example, in one example number_of_assets may be required to be greater than zero, and asset_id_length and language_length may be required to be greater than zero. In this case, the minimum number of bytes following descriptor_length would be seven. In this case, in one example, binary values of the 16-bit descriptor_length field may be sequentially mapped to integers within the range of 7 to 65,542.

Further, in some examples descriptor_length may be used to indicate the presence of data in the descriptor in addition to the respective syntax elements asset_id_length, asset_id_byte, language_length, language_byte, role, aspect_ratio, easy_reader, 3d_support, and reserved for each of the caption assets. For example, descriptor_length may have value greater than the value required to signal each of the sets of syntax elements asset_id_length, asset_id_byte, language_length, language_byte, role, aspect_ratio, easy_reader, 3d_support, and reserved for each caption asset. Table 16C provides an example of syntax for a caption_asset_descriptor message.

TABLE 16C

| Syntax | No. of Bits | Format |
|---|---|---|
| caption_asset_descriptor( ){ | | |
|     descriptor_tag | 16 | uimsbf |
|     descriptor_length | 16 | uimsbf |
|     number_of_assets | 8 | uimsbf |
|     for (i=0; i<number_of_assets; i++) { | | |
|         asset_id_length | 8 | uimsbf |
|         for (j=0; j<asset_id_length; j++) { | | |
|             asset_id_byte | 8 | uimsbf |
|         } | | |
|         language_length | 8 | uimsbf |
|         for (j=0; j< language_length; j++) { | | |
|             language_byte | 8 | uimsbf |
|         } | | |
|         role | 4 | bslbf |
|         aspect_ratio | 4 | bslbf |
|         easy_reader | 1 | bslbf |
|         profile | 2 | bslbf |
|         3d_support | 1 | bslbf |
|         reserved | 4 | bslbf |
|     } | | |
|     for (i=0; i<N; i++) { | | |
|         reserved_2 | 8 | bslbf |
|     } | | |
| } | | |

It should be noted that in the example of Table 16C syntax elements asset_id_length, asset_id_byte, language_length, language_byte, role, aspect_ratio, easy_reader, 3d_support, and reserved may be based on the definitions provided above with respect to Table 16B, and variations thereof, and for the sake of brevity the definitions are not repeated below. The for loop at the end of the descriptor in Table 16C may represent zero or more reserved bytes, i.e., zero or more bytes corresponding to reserved_2. In one example, the number of reserved bytes reserved_2 is determined by the value of descriptor_length and number of bytes used to signal number_of_assets, asset_id_length, asset_id_byte, language_length, language_byte, role, aspect_ratio, easy_reader, 3d_support, and reserved. In one example, the value of N in Table 16C may be equal to (descriptor_length—parsed bytes), where parsed bytes is the number of bytes used to signal number_of_assets, asset_id_length, asset_id_byte, language_length, language_byte, role, aspect_ratio, easy_reader, 3d_support, and reserved.

It should be noted that in some examples, one or more of the definitions of number_of_assets, asset_id_length, and language_length may be modified such that (descriptor_length—parsed bytes) is greater than or equal to zero. That is, for example, values of number_of_assets, asset_id_length, and language_length may be restricted such that parsed bytes is less than 65,536. As described above, a 16-bit descriptor_length field enables 65,536 values to be signalled. It should be noted that in some examples, descriptor_length field may include a number of bits greater than 16-bits. e.g., 17-bits, 18-bits, or 24-bits.

In one example, caption_asset_descriptor( ) may be required to satisfy the following equation:

number_of_assets*(asset_id_length+
language_length+4)+1<=(2^x−1), where y^z defines Exponentiation. i.e. it specifies y to the power of z; and x may be the number of bits descriptor_length.

That is, for each asset included in caption_asset_descriptor( ), the cumulative sum of asset_id_length value and (language_length value+4) shall be less than (2^x−1). In one example, for each integer in the range of 0 to (number_of_assets−1) inclusive, the cumulative sum of asset_id_length value and (language_length+4) shall be less than (2^x−1), where e.g., x=16 OR x=8. In one example, the value of number_of_assets field may be restricted to a range of values between a minimum integer value and a maximum integer value, both inclusive. In one example the minimum integer value may be 1. In one example the maximum integer value may be less than (2^x−1).

It should be noted that syntax element reserved_2 may enable future extensibility and backward compatibility. That is, newer fields may be added to the end of caption_asset_descriptor( ) illustrated in Table 8B without altering the syntax of number_of_assets, asset_id_length, asset_id_byte, language_length, language_byte, role, aspect_ratio, easy_reader, 3d_support, and reserved for a particular descriptor_tag. It should be noted that the number of bits that are used for descriptor_length provide capacity for the number of bytes that may be signalled using caption_asset_descriptor( ), and as such provide capacity for future extensibility. That is, for example, descriptor_length of 16-bits provide greater capacity than a descriptor_length of 8-bits.

Figure 7:
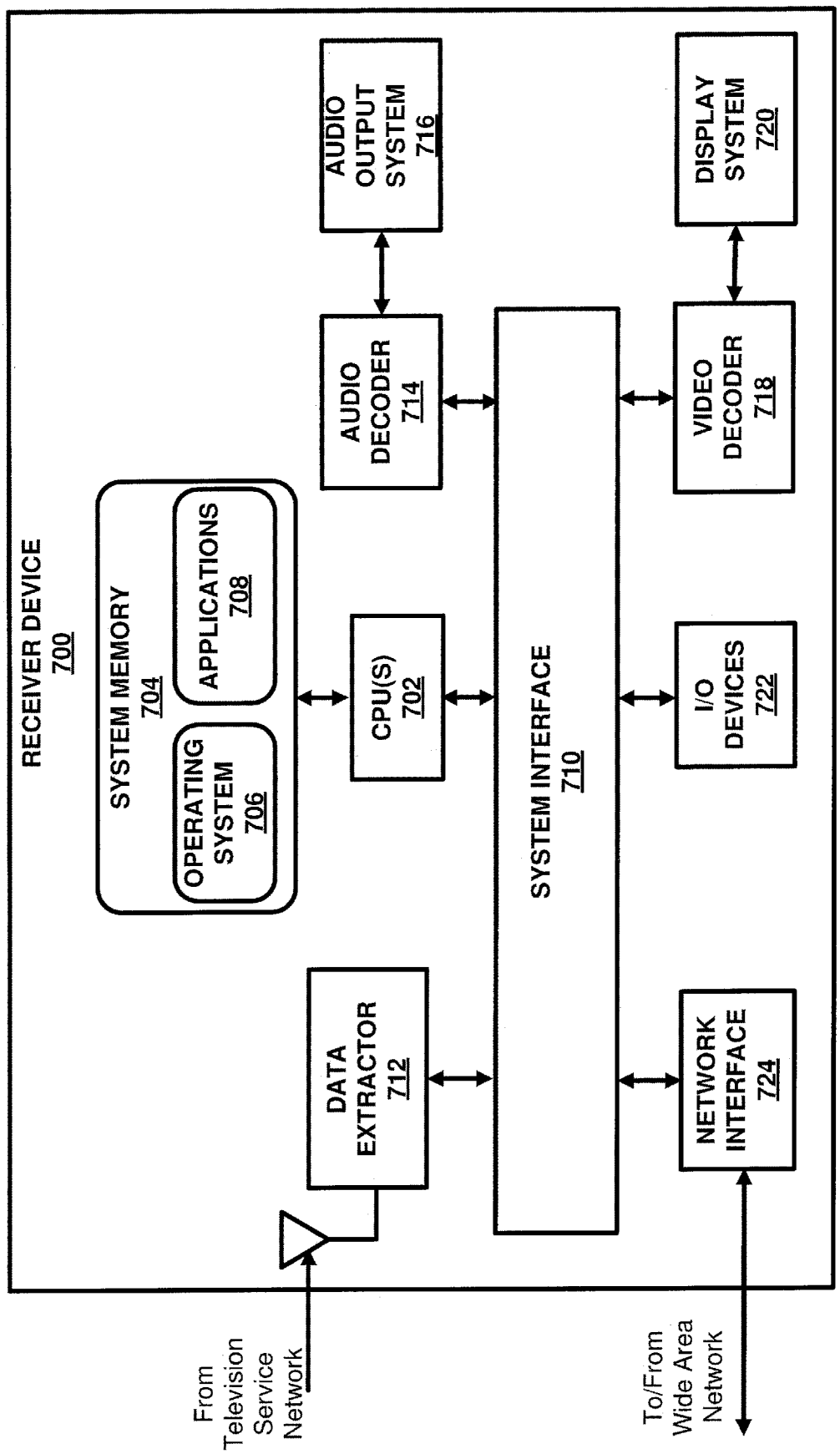
FIG. 7 is a block diagram illustrating an example of a receiver device that may implement one or more techniques of this disclosure.

FIG. 7 is a block diagram illustrating an example of a receiver device that may implement one or more techniques of this disclosure. That is, receiver device 700 may be configured to parse a signal based on the semantics described above with respect to Tables 16A and Table 16B and render captions in conjunction with a video and/or audio presentation. Further, receiver device 700 may be configured to determine whether the length of a caption descriptor is greater than a length required to signal a syntax element specifying the number of caption assets associated with the descriptor and syntax elements corresponding to each caption asset, and parse additional data included in the descriptor based on whether the length of the descriptor is greater than a length required to signal a syntax element specifying the number of caption assets associated with the descriptor and syntax elements corresponding to each caption asset. It should be noted that in one example, parsing additional data included in the descriptor based on whether the length of the descriptor is greater than a length required to signal a syntax element specifying the number of caption assets associated with the descriptor and syntax elements corresponding to each caption asset may include discarding additional data for a descriptor_tag value. For example, receiver device 700 may include a receiver device that does not support functionality associated with additional data. In the example where receiver device 700 includes a receiver device that does support functionality associated with additional data, receiver device 700 may perform functionality based on the additional data.

Receiver device 700 is an example of a computing device that may be configured to receive data from a communications network and allow a user to access multimedia content. In the example illustrated in FIG. 7, receiver device 700 is configured to receive data via a television network, such as, for example, television service network 104 described above. Further, in the example illustrated in FIG. 7, receiver device 700 is configured to send and receive data via a wide area network. It should be noted that in other examples, receiver device 700 may be configured to simply receive data through a television service network 104. The techniques described herein may be utilized by devices configured to communicate using any and all combinations of communications networks.

As illustrated in FIG. 7, receiver device 700 includes central processing unit(s) 702, system memory 704, system interface 710, data extractor 712, audio decoder 714, audio output system 716, video decoder 718, display system 720, I/O device(s) 722, and network interface 724. As illustrated in FIG. 7, system memory 704 includes operating system 706 and applications 708. Each of central processing unit(s) 702, system memory 704, system interface 710, data extractor 712, audio decoder 714, audio output system 716, video decoder 718, display system 720, I/O device(s) 722, and network interface 724 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although receiver device 700 is illustrated as having distinct functional blocks, such an illustration is for descriptive purposes and does not limit receiver device 700 to a particular hardware architecture. Functions of receiver device 700 may be realized using any combination of hardware, firmware and/or software implementations.

CPU(s) 702 may be configured to implement functionality and/or process instructions for execution in receiver device 700. CPU(s) 702 may include single and/or multi-core central processing units. CPU(s) 702 may be capable of retrieving and processing instructions, code, and/or data structures for implementing one or more of the techniques described herein. Instructions may be stored on a computer readable medium, such as system memory 704.

System memory 704 may be described as a non-transitory or tangible computer-readable storage medium. In some examples, system memory 704 may provide temporary and/or long-term storage. In some examples, system memory 704 or portions thereof may be described as non-volatile memory and in other examples portions of system memory 704 may be described as volatile memory. System memory 704 may be configured to store information that may be used by receiver device 700 during operation. System memory 704 may be used to store program instructions for execution by CPU(s) 702 and may be used by programs running on receiver device 700 to temporarily store information during program execution. Further, in the example where receiver device 700 is included as part of a digital video recorder, system memory 704 may be configured to store numerous video files.

Applications 708 may include applications implemented within or executed by receiver device 700 and may be implemented or contained within, operable by, executed by, and/or be operatively/communicatively coupled to components of receiver device 700. Applications 708 may include instructions that may cause CPU(s) 702 of receiver device 700 to perform particular functions. Applications 708 may include algorithms which are expressed in computer programming statements, such as, for-loops, while-loops, if-statements, do-loops, etc. Applications 708 may be developed using a specified programming language. Examples of programming languages include, Java™, Jini™, C. C++, Objective C, Swift. Perl, Python, PhP, UNIX Shell, Visual Basic, and Visual Basic Script. In the example where receiver device 700 includes a smart television, applications may be developed by a television manufacturer or a broadcaster. As illustrated in FIG. 7, applications 708 may execute in conjunction with operating system 706. That is, operating system 706 may be configured to facilitate the interaction of applications 708 with CPUs(s) 702, and other hardware components of receiver device 700. Operating system 706 may be an operating system designed to be installed on set-top boxes, digital video recorders, televisions, and the like. It should be noted that techniques described herein may be utilized by devices configured to operate using any and all combinations of software architectures.

System interface 710 may be configured to enable communications between components of receiver device 700. In one example, system interface 710 comprises structures that enable data to be transferred from one peer device to another peer device or to a storage medium. For example, system interface 710 may include a chipset supporting Accelerated Graphics Port (AGP) based protocols, Peripheral Component Interconnect (PCI) bus based protocols, such as, for example, the PCI Express™ (PCIe) bus specification, which is maintained by the Peripheral Component Interconnect Special Interest Group, or any other form of structure that may be used to interconnect peer devices (e.g., proprietary bus protocols).

As described above, receiver device 700 is configured to receive and, optionally, send data via a television service network. As described above, a television service network may operate according to a telecommunications standard. A telecommunications standard may define communication properties (e.g., protocol layers), such as, for example, physical signaling, addressing, channel access control, packet properties, and data processing. In the example illustrated in FIG. 7, data extractor 712 may be configured to extract video, audio, and data from a signal. A signal may be defined according to, for example, aspects DVB standards, ATSC standards, ISDB standards, DTMB standards, DMB standards, and DOCSIS standards.

Data extractor 712 may be configured to extract video, audio, and data, from a signal generated by service distribution engine 500 described above. That is, data extractor 712 may operate in a reciprocal manner to service distribution engine 500. Further, data extractor 712 may be configured to parse link layer packets based on any combination of one or more of the structures described above.

Data packets may be processed by CPU(s) 702, audio decoder 714, and video decoder 718. Audio decoder 714 may be configured to receive and process audio packets. For example, audio decoder 714 may include a combination of hardware and software configured to implement aspects of an audio codec. That is, audio decoder 714 may be configured to receive audio packets and provide audio data to audio output system 716 for rendering. Audio data may be coded using multi-channel formats such as those developed by Dolby and Digital Theater Systems. Audio data may be coded using an audio compression format. Examples of audio compression formats include Motion Picture Experts Group (MPEG) formats, Advanced Audio Coding (AAC) formats, DTS-HD formats, and Dolby Digital (AC-3) formats. Audio output system 716 may be configured to render audio data. For example, audio output system 716 may include an audio processor, a digital-to-analog converter, an amplifier, and a speaker system. A speaker system may include any of a variety of speaker systems, such as headphones, an integrated stereo speaker system, a multi-speaker system, or a surround sound system.

Video decoder 718 may be configured to receive and process video packets. For example, video decoder 718 may include a combination of hardware and software used to implement aspects of a video codec. In one example, video decoder 718 may be configured to decode video data encoded according to any number of video compression standards, such as ITU-T H.262 or ISO/IEC MPEG-2 Visual, ISO/IEC MPEG-4 Visual, ITU-T H.264 (also known as ISO/IEC MPEG-4 Advanced video Coding (AVC)), and High-Efficiency Video Coding (HEVC). Display system 720 may be configured to retrieve and process video data for display. For example, display system 720 may receive pixel data from video decoder 718 and output data for visual presentation. Further, display system 720 may be configured to output graphics in conjunction with video data, e.g., graphical user interfaces. Display system 720 may comprise one of a variety of display devices such as a liquid crystal display (LCD), a plasma display, an organic light emitting diode (OLED) display, or another type of display device capable of presenting video data to a user. A display device may be configured to display standard definition content, high definition content, or ultra-high definition content.

I/O device(s) 722 may be configured to receive input and provide output during operation of receiver device 700. That is, I/O device(s) 722 may enable a user to select multimedia content to be rendered. Input may be generated from an input device, such as, for example, a push-button remote control, a device including a touch-sensitive screen, a motion-based input device, an audio-based input device, or any other type of device configured to receive user input. I/O device(s) 722 may be operatively coupled to receiver device 700 using a standardized communication protocol, such as for example, Universal Serial Bus protocol (USB), Bluetooth. ZigBee or a proprietary communications protocol, such as, for example, a proprietary infrared communications protocol.

Network interface 724 may be configured to enable receiver device 700 to send and receive data via a local area network and/or a wide area network. Network interface 724 may include a network interface card, such as an Ethernet card, an optical transceiver, a radio frequency transceiver, or any other type of device configured to send and receive information. Network interface 724 may be configured to perform physical signaling, addressing, and channel access control according to the physical and Media Access Control (MAC) layers utilized in a network. Receiver device 700 may be configured to parse a signal generated according to any of the techniques described above with respect to FIG. 6. In this manner, receiver device 700 represents an example of a device configured parse a syntax element indicating the number of a concatenated syntax elements identifying a caption service, and parse one or more concatenated syntax elements identifying a caption service.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device (the video decoder and the video encoder) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

According to one example of the disclosure, a method for signaling video parameters using a media transport protocol, comprises signaling a syntax element providing information specifying constraints associated with a layer of encoded video data, signaling one or more flags indicating whether a type of information associated with the layer of encoded video data is signaled, and signaling respective semantics providing information associated with the layer of encoded video data based on the one or flags.

According to another example of the disclosure, a device for signaling video parameters using a media transport protocol comprises one or more processors configured to signal a syntax element providing information specifying constraints associated with a layer of encoded video data, signal one or more flags indicating whether a type of information associated with the layer of encoded video data is signaled, and signal respective semantics providing information associated with the layer of encoded video data based on the one or flags.

According to another example of the disclosure, an apparatus for signaling video parameters using a media transport protocol comprises means for signaling a syntax element providing information specifying constraints associated with a layer of encoded video data, means for signaling one or more flags indicating whether a type of information associated with the layer of encoded video data is signaled, and means for signaling respective semantics providing information associated with the layer of encoded video data based on the one or flags.

According to another example of the disclosure, a non-transitory computer-readable storage medium comprises instructions stored thereon that upon execution cause one or more processors of a device to signal a syntax element providing information specifying constraints associated with a layer of encoded video data, signal one or more flags indicating whether a type of information associated with the layer of encoded video data is signaled, and signal respective semantics providing information associated with the layer of encoded video data based on the one or flags.

According to one example of the disclosure, a method for signalling information associated with a caption service associated with a video or audio segment using a media transport protocol, comprises signalling a syntax element indicating the number of a concatenated syntax elements identifying a caption service, and signalling one or more concatenated syntax elements identifying a caption service.

According to another example of the disclosure, a device for signalling information associated with a caption service associated with a video or audio segment using a media transport protocol comprises one or more processors configured to signal a syntax element indicating the number of a concatenated syntax elements identifying a caption service, and signal one or more concatenated syntax elements identifying a caption service.

According to another example of the disclosure, an apparatus for signalling information associated with a caption service associated with a video or audio segment using a media transport protocol comprises means for signalling a syntax element indicating the number of a concatenated syntax elements identifying a caption service, and means for signalling one or more concatenated syntax elements identifying a caption service.

According to another example of the disclosure, a non-transitory computer-readable storage medium comprises instructions stored thereon that upon execution cause one or more processors of a device to signal a syntax element indicating the number of a concatenated syntax elements identifying a caption service, and signal one or more concatenated syntax elements identifying a caption service.

According to one example of the disclosure, a method for parsing information associated with a caption service associated with a video or audio segment, comprises parsing a syntax element indicating the number of a concatenated syntax elements identifying a caption service, and parsing one or more concatenated syntax elements identifying a caption service.

According to another example of the disclosure, a device for parsing information associated with a caption service associated with a video or audio segment comprises one or more processors configured to parse a syntax element indicating the number of a concatenated syntax elements identifying a caption service, and parse one or more concatenated syntax elements identifying a caption service.

According to another example of the disclosure, an apparatus for parsing information associated with a caption service associated with a video or audio segment comprises means for parsing a syntax element indicating the number of a concatenated syntax elements identifying a caption service, and parsing one or more concatenated syntax elements identifying a caption service.

According to another example of the disclosure, a non-transitory computer-readable storage medium comprises instructions stored thereon that upon execution cause one or more processors of a device to parse a syntax element indicating the number of a concatenated syntax elements identifying a caption service, and parse one or more concatenated syntax elements identifying a caption service.

According to another example of the disclosure, a device for parsing information associated with a caption asset associated with a video or audio segment using a media transport protocol, the device comprising one or more processors configured to parse a syntax element specifying the length of a descriptor, parse a syntax element specifying the number of caption assets associated with the descriptor, for each caption associated with the descriptor, parse a syntax element indicating a number of a concatenated syntax elements identifying a caption asset and parsing the number of concatenated syntax elements identifying a caption asset, determining whether the length of the descriptor is greater than a length required to signal a syntax element specifying the number of caption assets associated with the descriptor and syntax elements corresponding to each caption asset, and parsing additional data included in the descriptor based on whether the length of the descriptor is greater than a length required to signal a syntax element specifying the number of caption assets associated with the descriptor and syntax elements corresponding to each caption asset.

The invention claimed is:

1. A method for signaling caption asset information, the method comprising:
signaling the caption asset information including:
(i) a descriptor length syntax element representing a 16 bit unsigned integer field specifying a length in bytes immediately following the 16 bit unsigned integer field up to an end of the caption asset information,
(ii) a language length syntax element representing an 8-bit unsigned integer field specifying a length in bytes of a language of a caption asset, and
(iii) a language byte syntax element representing an 8-bit unsigned integer field containing a UTF-8 character of the language of the caption asset,
wherein
the language byte syntax element is signaled for j in a range of 0 to a value of the language length syntax element minus one.

2. The method of claim 1, wherein the language of the caption asset is given by a language identifier as defined by Internet Engineering Task Force Best Current Practice.

3. A device for signaling caption asset information, the device comprising:
one or more processors configured to signal the caption asset information including:
(i) a descriptor length syntax element representing a 16 bit unsigned integer field specifying a length in bytes immediately following the 16 bit unsigned integer field up to an end of the caption asset information,
(ii) a language length syntax element representing an 8-bit unsigned integer field specifying a length in bytes of a language of a caption asset, and
(iii) a language byte syntax element representing an 8-bit unsigned integer field containing a UTF-8 character of the language of the caption asset,
wherein
the language byte syntax element is signaled for j in a range of 0 to a value of the language length syntax element minus one.

4. A device for receiving caption asset information, the device comprising:
one or more processors configured to receive the caption asset information including:

(i) a descriptor length syntax element representing a 16 bit unsigned integer field specifying a length in bytes immediately following the 16 bit unsigned integer field up to an end of the caption asset information,
(ii) a language length syntax element representing an 8-bit unsigned integer field specifying a length in bytes of a language of a caption asset, and
(iii) a language byte syntax element representing an 8-bit unsigned integer field containing a UTF-8 character of the language of the caption asset,
wherein
the language byte syntax element is received for j in a range of 0 to a value of the language length syntax element minus one.

5. The method of claim 1, wherein the caption asset information includes a number of assets syntax element representing an 8-bit unsigned integer field specifying a number of caption assets,
wherein
the language byte syntax element is signaled for i in a range of 0 to a value of the number of assets syntax element.

\* \* \* \* \*